US012762086B2

(12) United States Patent
Arakelyan et al.

(10) Patent No.: US 12,762,086 B2
(45) **Date of Patent: *Oct. 13, 2026**

(54) SYSTEM AND METHOD FOR MULTI-FORMAT PROPOSAL EVALUATION AND ANALYSIS

(71) Applicant: Orion Score Corporation, Flushing, NY (US)

(72) Inventors: Emma Arakelyan, New York, NY (US); Diana Arzumanyan, Yerevan (AM); Andranik Yeritsyan, Yerevan (AM); Shahen Minasyan, Yerevan (AM); Hayk Zargaryan, Yerevan (AM); Yervand Sarkisyan, London (GB); Armen Kherlopian, Chestnut Ridge, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/970,750

(22) Filed: Dec. 5, 2024

(65) Prior Publication Data

US 2025/0321927 A1 Oct. 16, 2025

Related U.S. Application Data

(63) Continuation of application No. 18/634,383, filed on Apr. 12, 2024, now Pat. No. 12,197,381.

(51) Int. Cl.
*G06F 16/00* (2019.01)
*G06F 16/11* (2019.01)
*G06F 16/16* (2019.01)

(52) U.S. Cl.
CPC ............ *G06F 16/116* (2019.01); *G06F 16/16* (2019.01)

(58) Field of Classification Search
None
See application file for complete search history.

(56) References Cited

U.S. PATENT DOCUMENTS

| | | | | |
|---|---|---|---|---|
| 6,038,561 | A * | 3/2000 | Snyder | G06F 16/34 707/E17.08 |
| 7,711,635 | B2 * | 5/2010 | Steele | G06Q 40/02 705/38 |
| 12,197,381 | B1 * | 1/2025 | Arakelyan | G06F 16/116 |
| 2015/0032598 | A1 * | 1/2015 | Fleming | G06Q 40/03 705/38 |

FOREIGN PATENT DOCUMENTS

| | | | | |
|---|---|---|---|---|
| EP | 4198511 | A1 * | 6/2023 | G01N 33/6848 |

* cited by examiner

*Primary Examiner* — Tuankhanh D Phan
(74) *Attorney, Agent, or Firm* — Tono Law Group, LLC

(57) ABSTRACT

A system for criteria evaluation can include a memory device, a data processing platform with an evaluation engine, and a human interface device. The system can include a processor coupled to the memory device and connected to a remote computing device and to the data processing platform. The processor can be configured to receive an execution request and input data, to convert the input data into a first data format to generate a first data file, as well as to cause the evaluation engine to process the first data file by converting a plurality of subsets of data items into a corresponding plurality of sets of parameter values, to generate a set of scores and a message for the scores, to generate a file having a representation of the scores, and corresponding messages, to present the converted file on a user-interface device.

20 Claims, 6 Drawing Sheets

SYSTEM AND METHOD FOR MULTI-FORMAT PROPOSAL EVALUATION AND ANALYSIS

CROSS-REFERENCE TO RELATED APPLICATIONS

This application is a continuation of U.S. patent application Ser. No. 18/634,383, filed on Apr. 12, 2024. The entire contents of U.S. patent application Ser. No. 18/634,383 are incorporated herein by reference in their entirety for all purposes.

TECHNICAL FIELD

The disclosure is generally related to networked data processing systems. More specifically, this disclosure is related to distributed data evaluation and analysis systems and methods.

BACKGROUND

Implementations of the invention of the present disclosure are directed to methods and networked data processing systems that can perform distributed data evaluation and analysis to generate reports and scores based on information provided in multiformat submissions. The implementations described herein focus on a unique approach to analyzing, evaluating, and scoring various types of submissions of informational inputs that are respectively descriptive of proposed or ongoing collaborations, such as joint projects, scientific experiments, businesses, startups, social activism, and other joint endeavors. The various implementations can also be applied to analyzing, evaluating, and scoring various types of submissions of informational inputs that are respectively descriptive of potential or actual collaborators such as resume's, curriculum vitae (CVs), social networks, trade networks.

Traditionally, the evaluation of such submissions has been primarily reliant on human evaluators, who use their subjective judgment and knowledge to manually assess each submission. This approach has inherent limitations due to its opacity and lack of standardized metrics, making it difficult for proponents of submissions to obtain an objective and comprehensive analysis. Furthermore, even methods that employ more mathematical rigor, such as evaluations based on numerical data compiled in spreadsheets, often lack explanatory context. This absence of context limits the utility of the evaluation conducted by such methods, as it does not provide a holistic understanding of the submission's potential or areas for improvement.

These conventional methods significantly hinder the ability of submission proponents to receive a reliable and thorough evaluation that they can use as a basis for further development or improvement of their proposal (e.g., project, startup, experiment, collaborative network, etc.) Additionally, the existing technologies fail to offer a standardized tool that others can use to reliably assess and score these submissions. Moreover, current technologies are not readily available on an online platform, thereby limiting accessibility for both submission proponents and for others who may be interested in such analytics and evaluations.

In contrast, the implementations described herein address these shortcomings by providing a networked data processing system accessible through an online platform. This platform allows proponents to submit the details of their endeavor or proposal in a variety of formats and to receive a comprehensive analysis, evaluation, and scoring of their submission. The system is designed to process, and transform submitted information into various metrics, scores, explanations, and suggestions. These outputs offer a detailed and holistic evaluation of the submission, enabling both the proponents and other interested parties to utilize these metrics, scores, explanations, and suggestions as reliable standards for making informed decisions.

Furthermore, the present disclosure distinguishes itself from existing methods by its ability to process multi-format inputs through the networked system. This versatility enables the generation of audio, visual, or audio-visual representations of a robust and comprehensive evaluation and scoring report, complete with explanations and recommendations pertaining to the submission. The ease and seamlessness of both inputting submission information and accessing the resulting reports online significantly enhance the utility and accessibility of the system. This innovative approach is particularly beneficial for proponents seeking to further develop or improve the ongoing or proposed collaboration (e.g., joint projects, scientific experiments, businesses, startups, social activism, and other joint endeavors) as well as for those who are seeking to garner support, funding, or participation in the ongoing or proposed collaboration (e.g., joint projects, scientific experiments, businesses, startups, social activism, and other joint endeavors). Each of these potential or ongoing actions or activities (i.e., collaborations, joint projects, scientific experiments, businesses, startups, social activism, and other joint endeavors) can be interchangeably referred to as endeavors or collaborations herein.

The implementations of the present disclosure thus represent a significant advancement in the field of data processing systems for evaluation and analysis, offering a more objective, comprehensive, and accessible solution than currently available technologies.

SUMMARY

The various implementations of the invention described in more detail below can include a criteria evaluation and analysis system with one or more computing devices, processing devices, or processors that can be configured to perform particular operations or actions by virtue of having software, firmware, hardware, or a combination of them installed on the system that in operation causes or cause the system to perform the actions described. One or more computer programs can be configured to perform particular operations or actions by virtue of including instructions that, when executed by a processing or processor, cause it to perform the actions.

Accordingly, in some implementations the system can include a memory device, a data processing platform having an evaluation engine, and a human interface device. In these and other implementations, the system can also include a processor that is coupled to the memory device and that is communicatively connected to a remote computing device as well as to the data processing platform. In the various implementations, the processor can be configured to receive, from the remote computing device, an execution request and a set of input data, to convert the set of input data into a first data format to generate a first data file having multiple data items, to transmit the first data file to the evaluation engine, and to cause the evaluation engine to process the first data file to generate a set of intermediate scores, a combined score, and at least one message for the combined score and for each intermediate score. In some implementations, the processor can be configured to cause the evaluation engine to convert the combined score, the set of intermediate scores, and a plurality of corresponding messages into a second data file. It can also be configured to receive, from the evaluation engine, the second data file, to convert the second data file into a second format to generate a converted file having a representation of the combined score, a representation of each of the intermediate scores, and a representation of each of the corresponding messages, and, responsive to receiving the execution request, to present the converted file on an user-interface device. These and other implementations can include corresponding computer systems, devices, and computer programs recorded on one or more computer storage devices, each configured to perform the actions described herein.

In some implementations described herein that pertain to a method of evaluating, and scoring submission, the method can include receiving, from a remote computing device, an execution request and a set of input data, converting, by a processing device communicatively connected to the remote computing device, the set of input data into a first data format to generate a first data file having multiple data items. In some implementations, the method can furthermore include transmitting the first data file, by the processing device to an evaluation engine, and processing the first data file by the evaluation engine to generate a set of intermediate scores. In several implementations, processing the first data file can include: converting, by the evaluation engine, a first subset of data items from the first data file into a corresponding first set of parameter values, where each data item in the first subset corresponds to a respective parameter value in the first set of parameter values, converting, by the evaluation engine, a second subset of data items from the first data file into a corresponding second set of parameter values, where at least two data items from the second subset of data items are combined to compute at least one derived parameter value in the second set of parameter values, and segmenting, by the evaluation engine, the parameter values in the first set of parameter values and in the second set of parameter values into a plurality of information segments, where each information segment is associated with a corresponding parameter value. Processing the first data file can also include determining, by the evaluation engine, for each information segment, whether the corresponding parameter value satisfies a condition, and responsive to determining that the corresponding parameter value satisfies the condition, assigning an intermediate score to the corresponding parameter value. The method can further include combining, by the evaluation engine, the intermediate scores of the set of intermediate scores to generate a combined score, determining, by the evaluation engine, a corresponding message for each intermediate score and for the combined score respectively to generate a plurality of corresponding messages, and converting, by the evaluation engine, the combined score, the set of intermediate scores, and the plurality of corresponding messages into a second data file. The method can also include receiving, from the evaluation engine, the second data fil, converting the second data file into a second format to generate a converted file having a representation of the combined score, a representation of each of the intermediate scores, and a representation of each corresponding message, and responsive to the execution request, presenting the converted file on an user-interface device. Other implementations and embodiments of the invention can include corresponding computer systems, apparatus, and computer programs recorded on one or more computer storage devices, each configured to perform the actions of the described methods.

Some implementations and embodiments described herein relate to a non-transitory machine-readable that includes instructions that, when executed, causes a processing device to perform operations. For example, non-transitory machine-readable storage medium can include instructions that, when accessed by a processing device, cause the processing device to receive, from a remote computing device communicatively connected to the processing device, an execution request and a set of input data, where the set of input data comprises textual data and numerical data. The instructions in the medium can further cause the processing device to convert the set of input data into a first data format to generate a first data file having a plurality of data items, transmit the first data file, by the processing device to an evaluation engine, and cause the evaluation engine to process the first data file to generate a set of intermediate scores, a combined score, and at least one message for the combined score and for each intermediate score. The instructions in the medium can further cause the processing device to itself, in turn, cause the evaluation engine to convert the combined score, the set of intermediate scores, and a plurality of corresponding messages into a second data file. The instructions in the medium can further cause the processing device to receive, from the evaluation engine, the second data file, convert the second data file into a second format to generate a converted file having a representation of the combined score, a representation of each of the intermediate scores, and a representation of each of the corresponding messages. In some implementations, the instructions in the medium can further cause the processing device to, responsive to receiving the execution request, present the converted file on an user-interface device.

In some implementations, the instructions in the medium causing the processing device to cause the evaluation engine to process the first data file can include converting, by the evaluation engine, a first subset of data items from the first data file into a corresponding first set of parameter values, where each data item in the first subset corresponds to a respective parameter value in the first set of parameter values; converting, by the evaluation engine, a second subset of data items from the first data file into a corresponding second set of parameter values, where at least two data items from the second subset of data items are combined to compute at least one derived parameter value in the second set of parameter values, and segmenting, by the evaluation engine, the parameter values in the first set of parameter values and in the second set of parameter values into a plurality of information segments, where each information segment is associated with a corresponding parameter value. In these and other implementations, the instructions in the medium causing the processing device to cause the evaluation engine to process the first data file can include determining, by the evaluation engine, for each information segment, whether the corresponding parameter value satisfies a condition, and responsive to the evaluation engine determining that the corresponding parameter value satisfies the condition, assigning an intermediate score to the corresponding parameter value; combining, by the evaluation engine, two or more intermediate scores of the set of intermediate scores to generate a combined score. Further, the instructions in the medium causing the processing device to cause the evaluation engine to process the first data file can include determining, by the evaluation engine, a corresponding message for each intermediate score and for the combined score respectively to generate a plurality of corresponding messages. Implementations of the described techniques can include hardware, a method or process, or a computer tangible medium.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1:
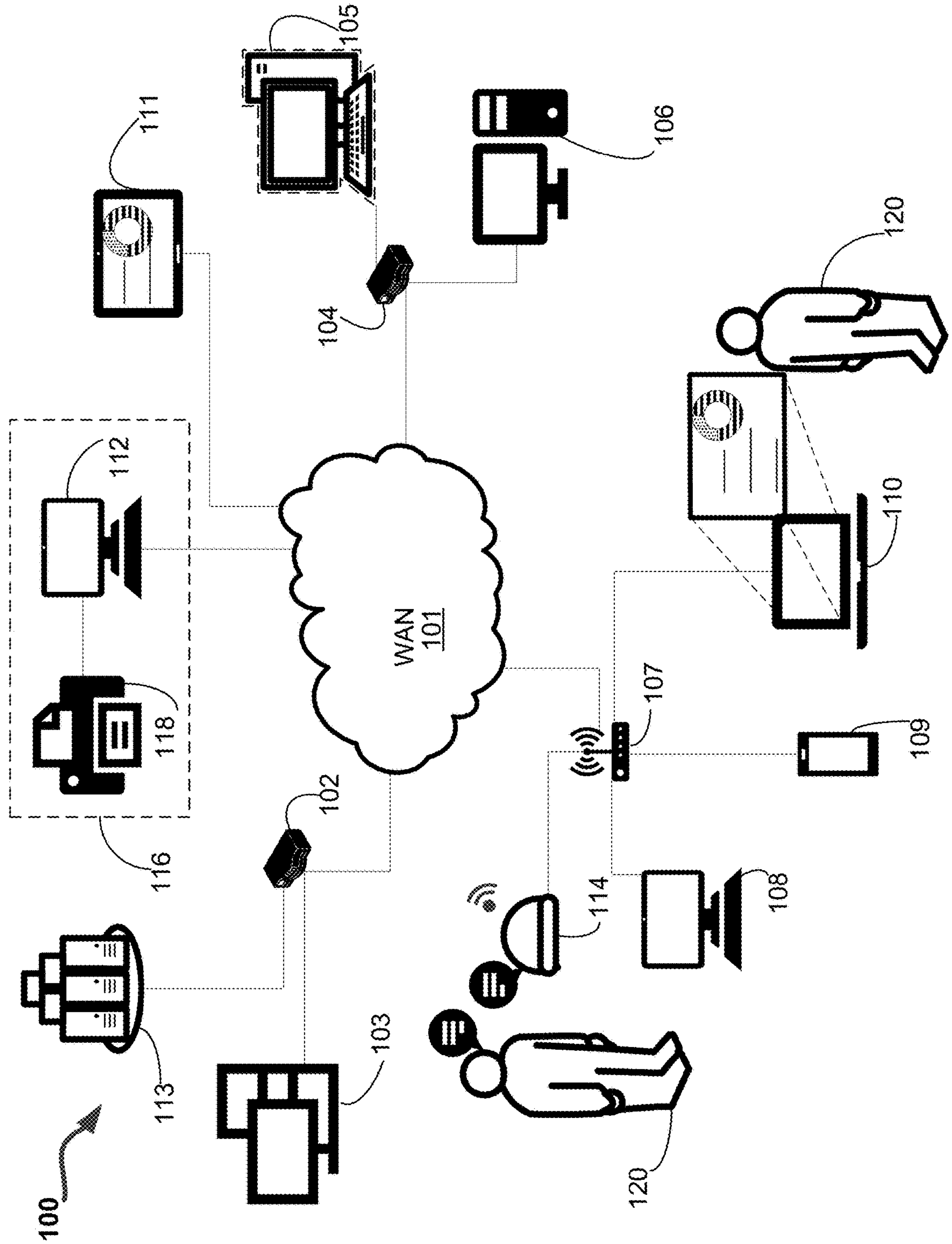
FIG. 1 depicts a schematic block diagram of an example networked system architecture, in accordance with one or more embodiments of the present disclosure.

Described herein are systems and methods for multi-format proposal submission evaluation and analysis. Embodiments of such systems and methods can be implemented in various localized and distributed networked computing environments. In today's increasingly globalized society, the manner in which individuals and organizations interact and collaborate has undergone a transformative shift. The advent of digital communication technologies has allowed our world to be more geographically distributed yet simultaneously made it more interconnected, enabling people from various locations around the globe to seek or propose potential collaborations, joint projects, scientific experiments, businesses, startups, social activism, and other joint endeavors with unprecedented ease. This evolution in collaboration dynamics presents unique opportunities and challenges for identifying, evaluating, and engaging in promising collaborative efforts.

Traditionally, the evaluation of such collaborative opportunities has been conducted manually, relying on subjective and unstandardized criteria that vary significantly among different evaluators and provide limited utility to the recipients of the evaluations and analyses. This piecemeal approach often leads to inefficiencies and inconsistencies in the assessment process, potentially overlooking viable and innovative collaborations and opportunities that could otherwise contribute positively to various fields, including technology, science, and social progress. The subjective nature of these evaluations further compounds the challenge of effectively matching proposed collaborations with suitable supporters, collaborators, funders, critics and other interested parties who may share similar goals and visions.

Recognizing the limitations inherent in these traditional evaluation methods, there is a clear benefit in having a more systematic and objective approaches to the assessment and evaluation of proposed or ongoing collaborations. The development of systems and methods of the various embodiments described herein for evaluating, analyzing, scoring, commenting on, supporting, criticizing, or collaborating on submissions offers a promising solution to meet these challenges. Such systems and methods can leverage the distributed nature of networked computing environments, allowing for the automation of objective evaluation and feedback processes and the facilitation of support, fundraising, and collaboration across geographic boundaries.

The disclosures described herein introduce innovative systems and methods designed for the evaluation and analysis of submissions that are respectively descriptive of proposed or ongoing endeavors. These systems and methods can be both either localized or inherently distributed, meaning that actions and processes involved can occur on a single machine or across multiple interconnected machines, enhancing the scalability and accessibility of the evaluation process. By standardizing the criteria for evaluation and allowing for the automatic analysis of submissions, the embodiments of the systems and methods disclosed herein provide a robust framework for facilitating meaningful and productive objectively reliable evaluations for use by both proponents of the submissions as well as other interested parties.

In this context, the present disclosure seeks to address the challenges faced when performing manual and subjective evaluation of collaborations by offering a comprehensive computerized solution that benefits both the proponents of submissions and potential supporters or collaborators. By streamlining the evaluation process and providing a platform for wide-ranging engagement and feedback, the systems and methods disclosed herein represent a significant advancement in the way collaboration, projects, businesses, startups, experiments, social activities, and other similar endeavors are identified, evaluated, and realized in our increasingly interconnected world.

The disclosed embodiments represent a sophisticated technological framework designed to facilitate the submission, processing, evaluation, and presentation of informational inputs descriptive of various collaborative endeavors such as joint projects, scientific experiments, and businesses. The various embodiments leverage advanced computing technologies to automate and enhance the evaluation process, thereby providing a more objective, comprehensive, and efficient approach to assessing the potential of proposed collaborations. At the core of this system is a networked architecture that seamlessly integrates multiple components, including user devices, an application server, a data processing platform with an evaluation engine, all of which can include memory devices, processors, and human interface devices.

Submissions composed of informational inputs can be initially inputted via a user device, which could range from personal computers to mobile devices. These inputs can then be aggregated and transmitted to an application server, where preliminary processing operations can be conducted. This preliminary processing can include the conversion of input data into a standardized format, facilitating uniformity and compatibility across the system. The processed data can be encapsulated in the form of file containing multiple data items, ready for further analysis and evaluation.

In several embodiments, central to the system's functionality is the data processing platform, which can house the evaluation engine. This engine can be designed to perform complex analytical operations on the data file, extracting meaningful insights and assessments from the informational inputs. The processor, which can be coupled to a memory device and communicatively connected to both a remote computing device and the data processing platform, can plays the role of orchestrating the flow of data through the system. It can handle the receipt of execution requests and input data sets from remote computing devices, manage the conversion and transmission of data files, and oversee the evaluation process conducted by the evaluation engine.

In some of the embodiments disclosed herein, upon receiving the first data file, the evaluation engine can execute a series of algorithms to generate a set of intermediate scores, a combined score, and corresponding messages for each score. These outputs can be indicative of the potential success and viability of the submitted collaborative endeavors, providing valuable feedback to the submitter and other interested parties. Following the evaluation, in some embodiments, the evaluation engine can compile these outputs into another data file, which can then be converted into a user-friendly format featuring insightful graphics and text messages. This converted file can be designed for presentation on a user-interface device, such as a webpage, enabling intuitive access and interpretation of the evaluation results by the submitter and other stakeholders.

The architecture of the various embodiments described in this disclosure encapsulates a comprehensive solution for the evaluation of collaborative project submissions. It integrates a series of technological components and processes to automate the submission, processing, and presentation of evaluation results, thereby addressing the challenges associated with manual and subjective assessment methods. Through its networked and distributed structure, the systems and methods of the various embodiments offer a scalable and accessible platform for fostering meaningful collaborations, support, investment, and feedback across various domains.

The implementations and embodiments described herein provide a seamless and integrated platform for submitting proposals (e.g., related to projects, investments, businesses, scientific experiments, social activism, etc.), having them analyzed and evaluated, and receiving feedback, all in one place through a unified interface. Each of these potential or ongoing actions or activities (i.e., collaborations, joint projects, scientific experiments, businesses, startups, social activism, and other joint endeavors) can be interchangeably referred to as endeavors or collaborations herein. In the various embodiments a variety of different multi-format inputs that are descriptive or reflective of an endeavor can be provided (e.g., entered through a user interface) as submissions for analysis and evaluation. The submission can then be processed by the various components of an embodiment of this disclosure by analyzing and evaluating the data and information that was included in the submission in various format. As previously noted, in the various embodiments, the constituent stages and steps of evaluation and analysis processes can be performed locally on a single computing device or can be performed across multiple computing devices that are communicably interconnected over a network. As will be described in more detail below with respect to the various embodiments, the aforementioned processing of information provided the submission can include combining the data included in the submission into various different files and formats, dividing the data into smaller portions of different formats, transmitting the data or portions of it to other components or computing devices, transforming the data into other formats, determining values based on portions of the data, assigning values to portions of the data, assigning various scores based on portions or the entirety of the data, generating various audio, video, graphical, textual and other presentations of evaluations, analyses, and feedback relating to the submission for submitter's (or other interested parties') access and review. To provide context for the various implementations and embodiments of the multi-format proposal evaluation and analysis, an example networked architecture is initially described below.

FIG. 1 depicts a schematic block diagram of an example networked system architecture, in accordance with one or more embodiments of the present disclosure. With reference to FIG. 1, a schematic overview of a system in accordance with an embodiment of the present disclosure is shown. In some embodiments, the system can include of one or more application servers 103 for electronically storing information used by the system and/or server clusters 113 for processing and outputting the information used by the system. For example, an application for receiving and reformatting information provided in submission can be hosted on one or more application servers 103 or server clusters 113. Applications in the server 103 or server clusters 113 can retrieve and manipulate information in storage devices and exchange information through a WAN 101 (e.g., the Internet). Applications in server 103 or server clusters 113 can also be used to manipulate information stored remotely and process and analyze data stored remotely across a WAN 101 (e.g., the Internet). For example, in some embodiments, an application in server 103 or server clusters 113 can receive, transmit, access, edit, and delete information that is located on other devices in the system or cause the data to be processed by other devices.

According to an example embodiment, exchange of information through the WAN 101 or other network can occur through one or more high speed connections. In some cases, high speed connections can be over-the-air (OTA), passed through networked systems, directly connected to one or more WANs 101 or directed through one or more routers 102. One of ordinary skill in the art would appreciate that there are numerous ways that server 103 can connect to WAN 101 for the exchange of information, and various embodiments of the present disclosure are contemplated for use with any method for connecting to networks for the purpose of exchanging information. Further, while this description refers to high speed connections, embodiments of the present disclosure can be utilized with connections of any speed.

Components, elements, or modules of the system can connect to server 103 or cluster 113 via WAN 101 or another network in various ways. For instance, a component or module can connect to the system (i) through a computing device 112 directly connected to the WAN 101, (ii) through a computing device connected to the WAN 101 through a routing device 102, 104, (iii) through a computing device 108, 109, 110, 114 connected to a wireless access point 107, or (iv) through a computing device 111 via a wireless connection (e.g., WiFi, CDMA, GMS, 3G, 4G, 5G, other suitable means, and means not yet invented) to the WAN 101. One of ordinary skill in the art will appreciate that there are numerous ways that a component, module, of the system can connect to server 103 via WAN 101 or another network, and embodiments of the present disclosure are contemplated for use with any method for connecting to server 103 via WAN 101 or another network. Furthermore, in some embodiments, server 103 can itself be, include, or be hosted on a personal computing device, such as a smartphone 109 or tablet 111, acting as a host for other computing devices to connect to. In several embodiments, server 103, cluster 113, laptop 110, personal computer 108, 106, 112, virtual machine 105, cell phones/smart phones 109, tablets 111 can likewise host a server. For example, a server acting as a data processing platform hosting an evaluation engine for processing, analyzing, and evaluating the aforementioned information and data can be running on at least one of these devices and be communicably connected to the application server.

Users 120 of the system in accordance with embodiments of the present disclosure can interact with the system via computing devices such as a laptop 110, personal computer 108, 106, 112, virtual computer 105, cell phones/smart phones 109, tablets 111, smart speakers 114, smart TVs, smart hubs, smart kiosks, and the like. Each of the steps and actions described herein can be performed via the input and output means of these respective devices including presentation of software user interface elements, presentation of prompts/questions to the user, collection of user input, receipt of multi-format submission data, as well as the subsequent presentation of reports, analyses, evaluations, suggestions, explanations, recommendation, scores, graphics, and other media. For example, a user 120 can operate a tablet 111 or laptop 110 to navigate to a browser interface presenting a web-based version of the software interface of the present disclosure and be presented with interactive elements on the screen of the laptop 100 or the user can provide inputs to the system via the touchscreen of the tablet 111. In other embodiments, a user 120 can operate smart speaker 114 to enter data and information of a submission regarding an endeavor through voice prompts and an interactive conversational process in a question-answer or prompt-response audio format.

Consequently, in some embodiments, multi-format (e.g., textual, audio, video, graphical, network graph, resume, network graph, numerical, etc.) data representative of the details of an endeavor can be input in a user device such as personal computer 108, 106, 112, virtual machine 105, smart phones 109, tablet 111 which can then transmit it to another device or component of the system. For example, smart phone 109 can transmit this information together with an execution request to an application server such as server 103.

In some embodiments, the tablet 111 can provide controls and interfaces that send user input to processed on a remote device such as a server 103 or cluster 113. It should be understood that the user 120 can interact with the software interface of the present disclosure by engaging user interface elements and entering input through a touch-screen of the tablet 111. Alternatively, in an embodiment of the present disclosure incorporating an audio device such as a smart speaker 114, a user can initialize an audio software interface to receive audio output and provide audio input to interact with the interface elements.

In an embodiment of the present disclosure, a system can include a memory device, a data processing platform that includes an evaluation engine, a human interface device, and a processor. The processor, which can be situated in server 103, can be coupled to the memory device and communicatively connected to a remote computing device, such as smartphone 109, as well as to the data processing platform hosted on server cluster 113. In the several embodiments, the data processing platform can be configured to generate scores based on input data. This architecture allows for robust data processing and evaluation capabilities within the system.

The processor can be configured to receive, from the remote computing device (e.g., smartphone 109), an execution request along with a set of input data. It can then convert this set of input data into a first data format, thereby generating a first data file that can include multiple data items. This conversion process facilitates the standardization and preparation of input data for further analysis.

In some embodiments, once the first data file is prepared, the processor can transmit it to the evaluation engine which can be located within the data processing platform on server cluster 113. The evaluation engine, upon receiving the first data file, can process it to generate a set of intermediate scores, a combined score, and at least one message for the combined score and for each intermediate score. This processing stage allows for the comprehensive analysis of the input data, providing valuable insights through scores and messages.

Further, the processor can cause the evaluation engine to convert the combined score, the set of intermediate scores, and multiple corresponding messages into a second data file. This conversion can encapsulate the analytical results in a format that can be more readily used for subsequent steps.

Following the receipt of the second data file from the evaluation engine, in some embodiments, the processor can convert this second data file into a second format. This conversion process can generate a converted file that includes a representation of the combined score, a representation of each of the intermediate scores, and a representation of each of the corresponding messages. The second format can be tailored to facilitate effective presentation and interpretation of the results. In some embodiments, the first data format can include textual, numerical data, structural data, multimedia data or a combination thereof, while the second format can include an audio, graphical, video, or audio-visual format.

In the several embodiments, the first data format can encapsulate a wide variety of data types to accommodate the diverse needs of submitting proposals, such as those related to projects, investments, businesses, scientific experiments, social activism, and more. Textual data can include plain text descriptions, written proposals, project plans, and detailed narratives of potential collaborations. Numerical data can include budget figures, statistical analyses, projected outcomes, performance metrics, and any quantifiable aspect of the proposals. Structural data can refer to formatted data such as XML or JSON files that structure the proposal information in a hierarchical or organized manner, enabling efficient processing and analysis by the system. Multimedia data extends the range of submissions to include images depicting prototypes or design concepts, audio recordings of pitches or explanations, and video presentations showcasing project demos or team introductions, offering a richer, more engaging submission experience.

In the various embodiments, the second format can be aimed at presenting the analysis and evaluation results, leverages different media to cater to various user preferences and scenarios. Audio formats can offer synthesized voice feedback, summarizing evaluation results, and providing recommendations, ideal for users who prefer listening over reading or are visually impaired. Graphical formats can include charts, graphs, and infographics that visually represent evaluation scores, trends, and comparisons, making complex data more accessible and easier to understand at a glance. Video formats can present dynamic, engaging content such as detailed feedback discussions, tutorials for suggested improvements, or visual summaries of the proposal's strengths and weaknesses. Audio-visual formats can combine both audio and visual elements, offering comprehensive feedback that can include voice-over explanations accompanying graphical data or animated presentations, providing an immersive feedback experience that appeals to both auditory and visual perception.

These varied data formats in submission and feedback stages enable a highly flexible and user-centric platform. Submitters can choose the most effective way to present their proposals, leveraging the format that best suits their content and audience. On the feedback side, users (e.g., submission proponents and other interested parties) can receive tailored, multimodal feedback that not only conveys the evaluation results in a clear, understandable manner but also enhances the feedback's effectiveness by catering to different learning styles and preferences. This approach ensures that the platform serves as a versatile tool for anyone looking to submit, evaluate, and refine proposals across a broad spectrum of domains.

In several embodiments, the processor can be further configured to present, responsive to receiving the execution request, the converted file on a user-interface device. In these and other embodiments, the processor can be configured to send the converted file to be presented via human-perceptible means (e.g., audio, visual, tactile etc.) on a human interface device such as a screen or a computerized printing system 116 communicably connected to the processor through WAN 101. For example, the converted file can be presented via a screen of smart phone 109 or printer 118 of the computerized printing system 116. This step allows for the audio-visual presentation and display of the analysis results, enabling users to interact with and understand the insights generated by the system. The user-interface device could range from computer monitors and speakers to portable devices, ensuring that the processed information is accessible to users through various mediums.

In some embodiments, the processor can be further configured to perform machine learning on the data of the received file. That is, the processor can be configured to, having received the second data file from the evaluation engine, encode a subset of parameter values in vector space to generate a parameter vector, to encode a subset of intermediate scores in vector space to generate a parameter vector, to cluster multiple parameter vectors in vector space, to cluster multiple intermediate scores in vector space, to associate a parameter vector with a measure of success, and to associate an intermedia score with a measure of success.

Accordingly, in these embodiments, the processor, which can be situated within server 103, can be configured to receive a second data file from an evaluation engine, the latter being hosted on a data processing platform within cluster 113. Following the reception of this data file, the processor can engage in a series of machine learning operations aimed at enhancing the analysis and interpretation of the data contained within.

Initially, the processor can encode a subset of parameter values in vector space, thereby generating a parameter vector. This operation involves transforming the parameter values, which can be discrete or continuous in nature, into a format that is conducive to computational analysis, particularly in applications involving machine learning or statistical modeling. Similarly, the processor can also encode a subset of intermediate scores in vector space, resulting in the creation of another set of parameter vectors. These intermediate scores, which can reflect the evaluation of specific aspects of the submissions, are similarly transformed into a format that facilitates computational analysis.

Following the encoding process, the processor can cluster a plurality of parameter vectors in vector space. This clustering process involves grouping parameter vectors based on their similarity, as determined by specific metrics or algorithms designed to identify patterns or relationships within the data. Such clustering can enable the identification of common themes or trends among the parameter values, thereby providing insights that can guide further analysis or decision-making.

In a parallel operation, the processor can also cluster a plurality of intermediate scores in vector space. This operation mirrors the clustering of parameter vectors, with the focus being on the intermediate scores that have been encoded in vector space. Clustering intermediate scores can help in understanding the distribution of evaluation metrics across the submissions, identifying outliers, or grouping submissions with similar evaluation profiles.

Furthermore, the processor can associate a parameter vector with a measure of success. This association involves linking the characteristics encapsulated within the parameter vector to an outcome or metric that defines success for the submissions being evaluated. This linkage can be based on historical data, expert judgment, or computational models that predict success based on the parameter values. Similarly, the processor can associate an intermediate score with a measure of success. This involves establishing a relationship between the score, which represents an evaluation of a specific aspect of a submission, and a success criterion. This association can provide detailed insights into how individual aspects of a submission contribute to its overall success potential.

The communications means of the system, according to embodiments of the present disclosure, can be any means for communicating data, including image and video, over one or more networks or to one or more peripheral devices attached to the system, or to a system module or component. Appropriate communications means can include, but are not limited to, wireless connections, wired connections, cellular connections, data port connections, Bluetooth® connections, or any combination thereof. One of ordinary skill in the art will appreciate that there are numerous communications means that can be utilized with embodiments of the present disclosure, and embodiments of the present disclosure are contemplated for use with any communications means.

Traditionally, a computer program includes a finite sequence of computational instructions or program instructions. It will be appreciated that a programmable apparatus or computing device can receive such a computer program and, by processing the computational instructions thereof, produce a technical effect. It should be understood that a programmable apparatus or computing device can include one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this specification and elsewhere, a computing device can include any and all suitable combinations of at least one general purpose computer, special-purpose computer, programmable data processing apparatus, processor, processor architecture, and so on. It will be understood that a computing device can include a computer-readable storage medium and that this medium can be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the present disclosure as claimed herein could include an optical computer, quantum computer, analog computer, or the like.

Any combination of one or more computer readable medium(s) can be utilized with the various embodiments of the present disclosure. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. Illustrative examples of the computer readable storage medium can include the following: an electrical connection having one or more wires, a portable computer diskette, a hard disk, floppy disks, optical disks (such as Blu-Ray disks, DVDs), CD-ROMs, and magnetic-optical disks, solid-state drives (SSDs), flash memory devices (including USB flash drives and SD cards), read-only memories (ROMs), random access memories (RAMs), dynamic random access memories (DRAMs), synchronous dynamic random access memories (SDRAMs), electrically erasable programmable read-only memory (EEPROMs), magnetoresistive random-access memories (MRAMs), ferroelectric RAM (FRAM), Phase-change memory (PCM), optical cards, a memory stick, three-dimensional (3D) XPoint and other non-volatile memory, a mechanically encoded device such as punch-cards or raised structures in a groove having instructions recorded thereon, and any suitable combination of the foregoing.

A data store can include one or more of a database, file storage system, relational data storage system or any other data system or structure configured to store data. The data store can be a relational database, working in conjunction with a relational database management system (RDBMS) for receiving, processing and storing data. For example, databases that embodiments of this disclosure can employ can be relational databases such as MySQL, PostgreSQL, Oracle Database, Microsoft SQL Server, and SQLite, each offering robust support for structured data and SQL queries. Analogously, in some embodiments, non-relational databases like MongoDB, Apache Cassandra, Google Firestore, Amazon DynamoDB, Couchbase, Hbase, big-table, and Neo4j, which are optimized for scalability, flexibility, and the efficient handling of unstructured or semi-structured data, can be used. A data store can include one or more databases for storing information related to the processing of moving information and estimate information as well one or more databases configured for storage and retrieval of moving information and estimate information.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Computer readable program instructions described herein can be downloaded to respective computing/processing devices from a computer readable storage medium or to an external computing device or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The flowchart and block diagrams in the Figures illustrate the architecture, functionality, and operation of possible implementations of systems, methods, and computer program products according to the various embodiments hereof. In this regard, each block in the flowchart or block diagrams can represent a module, segment, or portion of instructions, which comprises one or more executable instructions for implementing the specified logical function (s). In some alternative implementations, the functions noted in the blocks can occur out of the order noted in the figures.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. An additional detailed explanation of an example networked system architecture according to the various implementations of this disclosure is provided in the following description.

Figure 2:
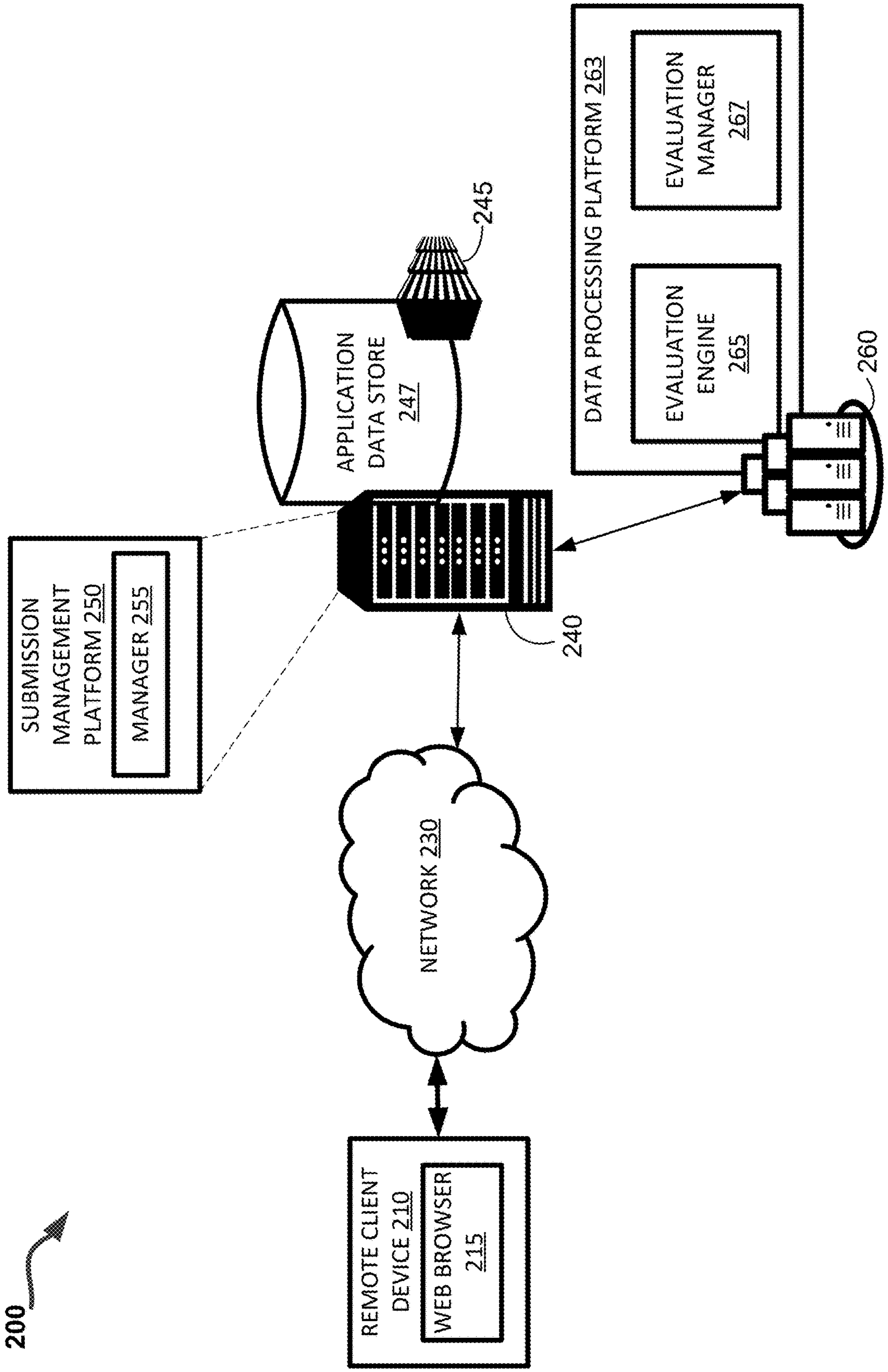
FIG. 2 depicts a schematic block diagram of an example networked system architecture, in accordance with one or more embodiments of the present disclosure.

FIG. 2 depicts a schematic block diagram of another example networked system architecture, in accordance with one or more embodiments of the present disclosure. In some of these embodiments, a system 200 can include computing components that perform a variety of operations for the analysis and evaluation of submissions received from users or entities. For example, a processing device (e.g., a server 240) can be configured to receive, from a remote client device 210 equipped with web browser 215, an execution request along with a set of input data. The remote client device 210 can be connected to a network 230, facilitating the transfer of data to a processing device, which can be exemplified by server 240. The server 240 can be communicably connected to an application data store 247. The application data store 247 may be local to the server or may be a part of a distributed storage resource pool 245.

In several embodiments, server 240, running submission management platform 250 and managed by submission manager 255, can convert the received set of input data into a first data format. This conversion process can generate a first data file that can include multiple data items, effectively standardizing the data for further processing. The first data file can then be transmitted to an evaluation engine 265, hosted on a data processing platform 263 within computing resource cluster 260. The evaluation engine 265, managed by evaluation manager 267, can undertake the task of processing the first data file to generate a comprehensive set of intermediate scores.

Processing the first data file can, in some embodiments, include several operations by the evaluation engine 265. Initially, a first subset of data items from the first data file can be converted into a corresponding first set of parameter values, with each data item in the first subset corresponding to a respective parameter value in the first set. Similarly, a second subset of data items from the first data file can be converted into a corresponding second set of parameter values, with at least two data items from the second subset being combined to compute at least one derived parameter value in the second set. Following this, the evaluation engine 265 can segment the parameter values in both sets into a plurality of information segments, where each segment is associated with a corresponding parameter value.

For each information segment, the evaluation engine 265 can determine whether the corresponding parameter value satisfies a specified condition. If the condition is satisfied, an intermediate score can be assigned to the parameter value. Subsequently, the intermediate scores can be combined, by the evaluation engine 265, to generate a combined score. Additionally, the evaluation engine 265 can determine a corresponding message for each intermediate score and for the combined score, thereby generating a plurality of corresponding messages.

The evaluation engine 265 can then convert the combined score, the set of intermediate scores, and the corresponding messages into a second data file and send it to the processing device 240. Upon receiving this second data file, the processing device (e.g., server 240) can convert it into a second format to generate a converted file. This file can comprise a representation of the combined score, a representation of each of the intermediate scores, and a representation of each corresponding message.

Responsive to the initial execution request (i.e., the request received by processing device 240 from remote client device 210 through network 230), the converted file can be presented on a user-interface device (e.g., a screen of the remote client device 210). This presentation allows users to interact with and understand the analytical results generated by the system, facilitating informed decision-making or further actions based on the evaluations provided by the system. More detailed explanations of the operation of example systems and the actions and steps performed by the various components according to the various embodiments and implementations of this disclosure are provided in the following description.

Figure 3:
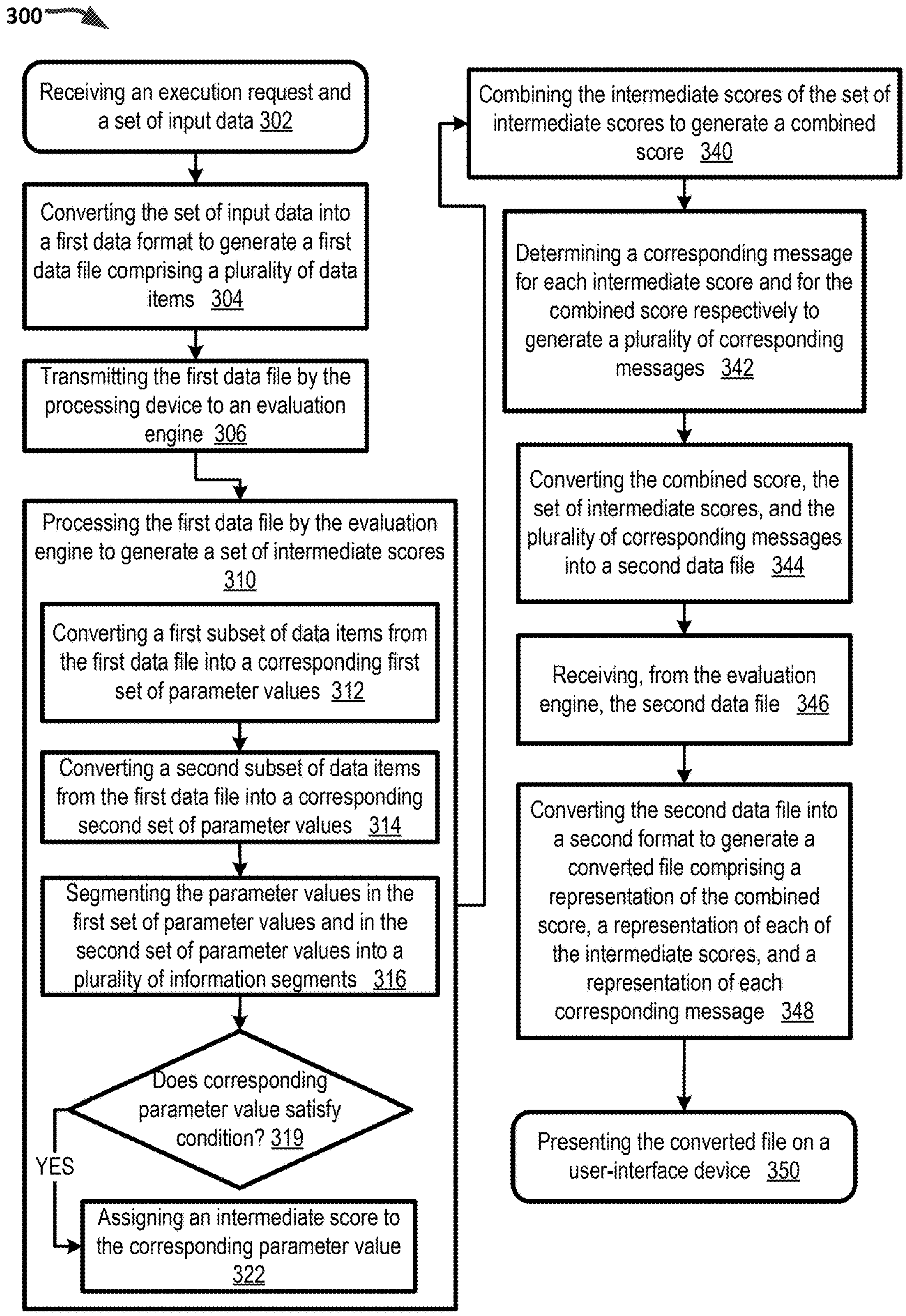
FIG. 3 depicts a flow diagram of an example method for multi-format proposal evaluation and analysis, in accordance with one or more embodiments of the present disclosure.

A flow diagram of an example method 300 for multi-format proposal evaluation and analysis according to some embodiments and implementations of the present disclosure is described with reference to FIG. 3 and continued reference to FIGS. 1-2. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 can be performed by one more computing components or processing devices described earlier with reference to FIGS. 1-2. For example, in some embodiments, one or more steps, operations, or actions of the method 300 can be performed by the server 103, cluster 113, laptop 110, personal computer 108, 106, 112, virtual machine 105, cell phone/smart phone 109, or tablet 111 of FIG. 1 while in the same or other embodiments, one or more steps, operations, or actions of the method 300 can be performed by the remote client device 210, server 240, or evaluation engine 265 running on computing cluster 260 of FIG. 2. It should be understood that one component of the embodiments described herein can cause another component to perform any of the described actions. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible and are contemplated by this disclosure without each being individually described.

In some implementations, at block 302 the processing logic can receive, from a remote computing device, an execution request together with the set of input data. For example, processing logic (e.g., of a processor of application server 103) can receive from a remote device (e.g., smart phone 109) the data representative of the details of an endeavor and an execution request to process the data. Further, the processing logic can, at block 304, convert the set of input data into a particular data format to generate a specific type of data file that contains multiple data items within it. For example, the processing logic can convert the data into a JavaScript Object Notation (JSON) file format that contains multiple data items each of which represent a portion of the inputted data. It should be understood that, in the various embodiments, the data can be converted into files of various types and formats such as XML (extensible Markup Language), CSV (Comma-Separated Values), YAML (YAML Ain't Markup Language), INI (Initialization File Format), TOML (Tom's Obvious, Minimal Language), Protobuf (Protocol Buffers), MessagePack etc., and that the embodiment and implementations described herein contemplate the use of these and other file formats without limitation.

In the several embodiments, at block 306, the processing logic can, transmit the data file to an evaluation engine. For example, in some embodiments, a server 103, cluster 113, or another device in the system such as tablet 111, or computer 106 can host the data processing platform containing the evaluation engine. Accordingly, the processing logic (e.g., from one of these devices that received the inputted data and converted it into a data file) can then transmit the data file to an evaluation engine (e.g., hosted on server 103, cluster 113, or another device in the system such as tablet 111, or computer 106) via WAN 101.

Additionally, in some of the embodiments, the processing logic can (e.g., via a processor causing the evaluation engine to perform subsequent steps), at block 310, process the data file to generate a set of intermediate scores, a combined score, and at least one message for the combined score and for each intermediate score. That is, in some embodiments, the processor can control or command the evaluation engine either directly (e.g., if it's hosted on the same machine as the processor) or via WAN 101 to generate set of intermediate scores, a combined score, and at least one message for the combined score and for each intermediate score where each of the scores and messages are based on the data and the information included in the data file received by the evaluation engine from the processor.

Processing the data file, at block 310, (e.g., by causing the evaluation engine 265 to process the data file), can include converting, at block 312, a subset of data items from the data file into a corresponding set of parameter values, wherein each data item in the subset corresponds to a respective parameter value in the set of parameter values. It can also include, the processing logic, at block 314, to convert (e.g., by causing the evaluation engine 265 to convert) another subset of data items from the data file into another corresponding set of parameter values, where at least two data items from the second subset of data items are combined to compute at least one derived parameter value in the second set of parameter values.

For example, in a data file that includes a data item of information about a duration of years for which an endeavor (e.g., a project, business, experiment) has been ongoing, a data item reflective of the duration can be converted to a parameter value. Similarly, in a data file that includes a data item of information reflective of an amount of collaborators or supporters of which an endeavor, the data item reflective of the amount can be converted to a corresponding parameter value. The processing logic can, in another example, to take a data item (i.e., from the data file) reflective of a number of experiments that the submission proponent has conducted as well as a data item reflective of the number of collaborators or staff with a particular qualification and compute or generate a derived parameter value on that basis (i.e., the parameter can be derived from multiple data items and not just one). In this manner, a set of parameter values with a one-to-one data-item-to-parameter-value correspondence and a set of a parameter values with a multiple-to-one data-item-to-parameter-value correspondence can be created.

In some embodiments, the processing logic processing, at block 310, the data file can include segmenting, at block 316 (e.g., via the evaluation engine 265), the parameter values in the first set of parameter values and in the second set of parameter values into a plurality of information segments, wherein each information segment is associated with a corresponding parameter value. For example, segmenting the data at block 316, can include performing data segmentation on parameter values associated with submissions descriptive of potential collaborations, joint projects, scientific experiments, businesses, startups, social activism, and other joint endeavors. The segmentation process can divide the parameter values into multiple information segments, where each information segment is associated with a corresponding parameter value, facilitating a nuanced and targeted analysis of submissions.

The processing logic can initiate, at block 316, the segmentation process by determining segmentation criteria, which can vary based on the nature of the endeavor of the submission and the objectives of the evaluation. Criteria for segmentation could include, but are not limited to, geographic location, financial metrics, technological fields, innovation levels, and societal impact. For example, endeavors could be segmented by geographic regions (e.g., North America, Europe, Asia), funding requirements (e.g., <$50,000, $50,000-$200,000, >$200,000), or areas of technological innovation (e.g., biotechnology, software development, renewable energy), duration (e.g., <1 month, 1 month-2 years, >2 years) etc.

Following the establishment of segmentation criteria, the processing logic can proceed to create information segments corresponding to these criteria. Each segment can represent a specific range or category of parameter values. For instance, endeavors that involve collaboration led by a leader, each segment can represent a range or level of experience that the leader has (e.g., <1 year, 1-5 years, >5 years or <2 projects, 2-4 projects, >4 projects).

Subsequently, the processing logic can, at block 316, associate each parameter value from the submitted data with the appropriate information segment. This association can be accomplished through a systematic analysis of parameter values, wherein the engine assigns each value to a segment that best matches its characteristics based on the predefined criteria.

In some embodiments, the processing logic processing the data file at block 310 (e.g., by the processor causing the evaluation engine to process the data file) can further include the processing logic determining, at block 319 (e.g., via the evaluation engine 265), for each information segment, whether the corresponding parameter value satisfies a condition. It can also include, responsive to the processing logic determining, at block 319, that the corresponding parameter value satisfies the condition, the processing logic assigning, at block 322, an intermediate score to the corresponding parameter value. Accordingly, upon completion of the segmentation process, processing logic can undertake an intricate analysis within each information segment, as delineated in the present disclosure. This action can be initiated by the processing logic (e.g., via the evaluation engine 265) examining each information segment to ascertain whether the associated parameter value satisfies a predetermined condition reflective of the objectives and criteria of the evaluation process. Conditions can range from quantitative thresholds, such as minimum financial investment levels, to qualitative assessments, like innovation novelty or project alignment with specified technological domains.

In some embodiments, the processing logic segmenting the data in block 316 can include assigning an information category label to at least one parameter value in at least one of the sets of parameter values. The processing logic determining, at block 319, for each information segment, whether the corresponding parameter value satisfies a condition can, in turn, include determining whether the corresponding parameter satisfies a stop-factor condition.

Accordingly, the process of segmenting can involve the assignment of an information category label to at least one parameter value within at least one of the sets of parameter values. In some embodiments, this task can be facilitated by the processor, which can be located in server 103, and which can initiate the evaluation engine, hosted on a data processing platform within cluster 113, to process the first data file. Following the initiation, the evaluation engine can segment the data, efficiently categorizing the diverse parameter values into information segments based on predefined criteria and associated information category labels.

The categorization into information segments enables a structured analysis, where each segment can be associated with distinct characteristics or themes related to the collaborative endeavors being evaluated. These themes can range widely, encompassing aspects such as geographic regions, technological domains, project scales, or innovation levels, among others. An information category label can serve as a tag that encapsulates the essence of the parameter values within each segment, facilitating targeted and relevant analyses by the evaluation engine. In some embodiments, the category labels can include submission proponent identity (e.g., company founder), traction (e.g., how well an ongoing experiment has been received), team (e.g., a social movement's executive members), scalability and growth potential (e.g., a startup's ability to grow quickly), industry fit (e.g., how well a proposed project meets the needs of an industry), disruptiveness (e.g., a measure of how disruptive a proposed collaboration would be in an economic sector). In several embodiments, each of these categories can have sub-categories or supra-categories. The various embodiments described herein are contemplated to encompass any combination of categories into which information segments and corresponding parameters can be categorized.

Further, for each information segment, the processing logic can, at block 319, determine whether the corresponding parameter value satisfies a specific condition including assessing whether the corresponding parameter satisfies the stop-factor condition mentioned earlier. A stop-factor condition can represent a critical criterion that parameter values must meet or avoid to be considered favorable or unfavorable for the evaluated endeavor. For example, in the context of evaluating potential business startups, a stop-factor condition could relate to the amount of available funding, experience of the business owner, feasibility of the proposed business model, regulatory compliance, or the presence of significant market competition. Thus, responsive to the determination, by the processing logic at block 319, that a parameter value within an information segment meets the prescribed condition, an intermediate score can be duly assigned to that parameter value.

Determining whether a parameter value satisfies a stop-factor condition, at block 319, can involve complex logic and data analysis capabilities of the processing logic. In some examples, the processing logic can cause a processing device or the evaluation engine 265 to apply algorithmic checks or pattern recognition techniques to ascertain if parameter values within each information segment meet the predefined stop-factor conditions. This determination can significantly impact the subsequent processing steps, influencing the assignment of scores or the generation of feedback related to each submission. This assignment process can be integral to the evaluation mechanism, and can enable a quantifiable assessment of each parameter's contribution to the overall viability and merit of the submission, and consequently, the proposed/submitted endeavor. Intermediate scores can serve as a more granular measure of the submission's alignment with the evaluative criteria across different dimensions, such as financial viability, technological innovation, societal impact, or geographic relevance.

In some embodiments, the processing logic can further, at block 340, combine two or more intermediate scores of the set of intermediate scores to generate a combined score, and determine (e.g., by causing a processing device or the evaluation engine to determine), at block 342, a corresponding message for each intermediate score and for the combined score respectively to generate multiple corresponding messages. Thus, subsequent to the assignment of intermediate scores, the processing logic can, at block 340, proceed to synthesize these scores, amalgamating two or more intermediate scores from the set to formulate a combined score. This combined score embodies a holistic evaluation of the submission, encapsulating its multifaceted strengths and potential areas for improvement. The generation of the combined score can offer a comprehensive metric that facilitates comparative analysis across submissions.

In parallel with the scoring mechanism, the processing logic can, at block 342, determine a corresponding message for each intermediate score as well as for the combined score. These messages can be tailored to provide contextual insights and feedback related to each score, elucidating the rationale behind the score and offering guidance or recommendations for enhancing the submitted endeavor. For instance, a message accompanying an intermediate score related to financial viability might highlight strengths in budget allocation or suggest areas where financial planning could be optimized. Similarly, a message associated with the combined score could offer an overarching evaluation of the submission's prospects, underscoring salient features or identifying key opportunities for further development.

In some embodiments, the processing logic can convert (e.g., by causing a processor or evaluation engine to convert), at block 344, the combined score, the set of intermediate scores, and a plurality of corresponding messages into a second data file as well as to receive, at block 346, from the evaluation engine, the second data file. In several embodiments, the processing logic can transmit (e.g., send and receive) the second data file once it is generated. The processing logic can also, in some embodiments, convert, at block 348 the second data file into a second format to generate a converted file that includes a representation of the combined score, a representation of each of the intermediate scores, and a representation of each of the corresponding messages, and responsive to receiving the execution request (i.e., from the user device through which the input data was provided), present the converted file on a user-interface device. Consequently, the processing logic, can then present, at block 350, the converted file on a user interface device.

Accordingly, these operations can be performed by an example system in the several embodiments of this disclosure. For example, a processor, which can be located in server 103, can be configured to interface with the evaluation engine that can be hosted on a data processing platform within cluster 113. This processor can initiate a sequence of operations following the processing of a first data file by the evaluation engine, where the first data file can contain parameter values and respective information segments derived from the submissions. These actions can transform the raw analytical outputs into a format that can be comprehensible and user-friendly for presentation.

Upon successful processing of the first data file, the processor can instruct the evaluation engine 265 to undertake a conversion process. This process can involve the evaluation engine generating a second data file from the analytical results, which can include a combined score, a set of intermediate scores derived from the evaluation of individual parameter values within the information segments, and multiple corresponding messages that provide context and insights related to each score. The combined score can encapsulate an overarching assessment of the submission, while the intermediate scores can offer detailed feedback on specific aspects evaluated by the engine.

Following the creation of the second data file by the evaluation engine 265, server 103, through its processor, can receive this file. The processor then can execute a conversion operation on this second data file, translating it into a second format (i.e., a format that can be different from the format of the first file) that is optimized for presentation. This conversion process can result in the generation of a converted file. The converted file can be structured to include a representation of the combined score, individual representations of each intermediate score, and visual or textual representations of the corresponding messages. These representations can be designed to ensure clarity and ease of interpretation by the end-user.

The conversion into the second format can be carefully engineered to cater to the presentation requirements on various user-interface devices. For example, graphical representations might be utilized to depict scores in a visually engaging manner, audio can be used to convey or highlight important points, while textual messages can be formatted for easy reading. This can ensure that the insights and evaluations conveyed by the evaluation engine are accessible and comprehensible to users, facilitating informed decision-making.

Accordingly, the processor on server 103 can be further configured to, responsive to the receipt of an execution request from a user device (e.g., the execution request that was sent together with the input data), present the converted file on a user-interface device. This presentation can take the form of a webpage, application interface, or any other digital medium capable of displaying or presenting textual, audio, or visual information (e.g., a smart speaker or tablet). The user-interface device could range from desktop computers to mobile devices, ensuring that the evaluated data and corresponding analyses are readily available to users regardless of their access point. Additional and alternative detailed explanations of the operation of example systems and the actions and steps performed by the various components according to the various embodiments and implementations of this disclosure are provided in the following description.

Figure 4:
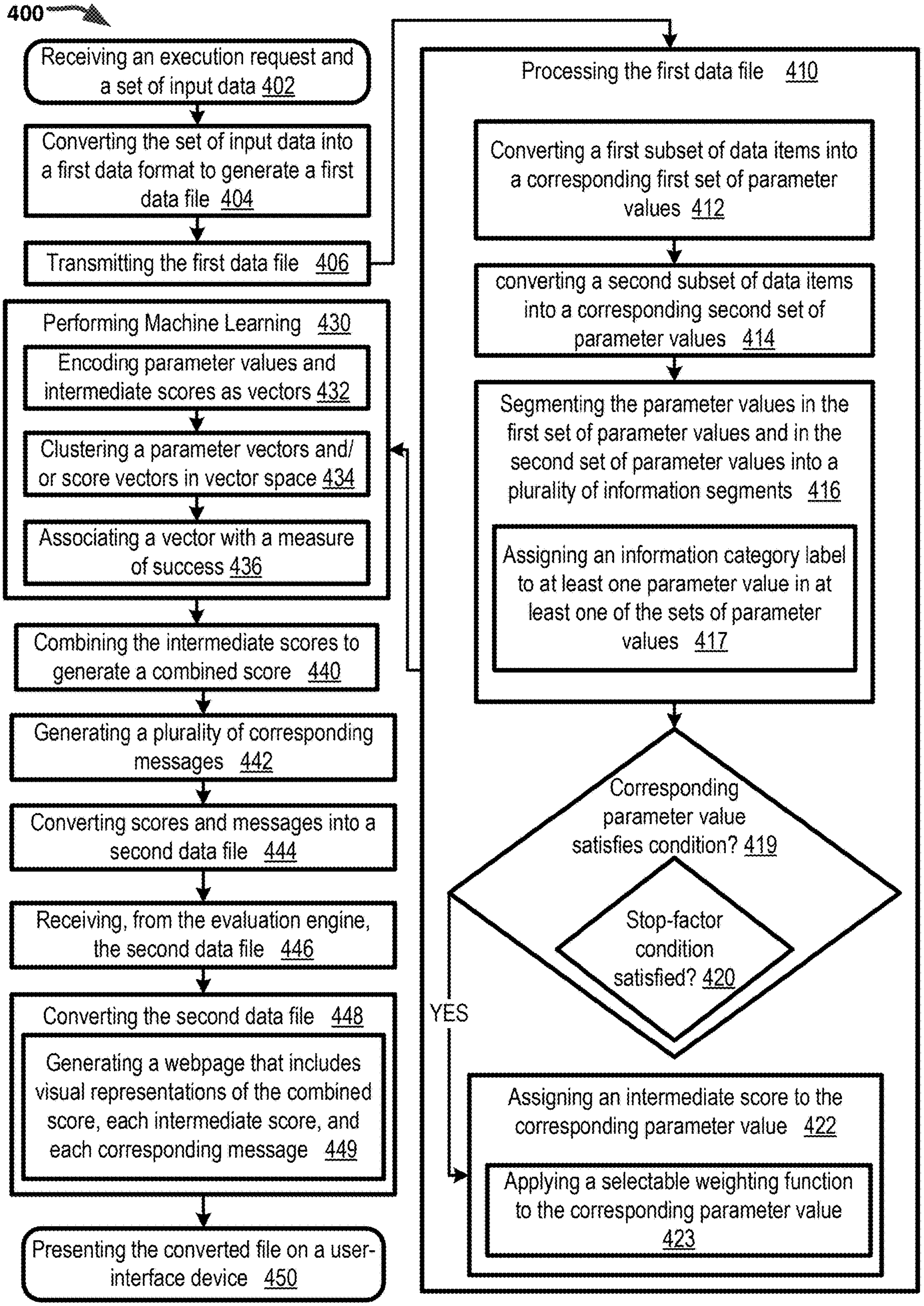
FIG. 4 illustrates a flow diagram of an example method for multi-format proposal evaluation and analysis, in accordance with one or more embodiments of the present disclosure.

A flow diagram of another example method 400 for multi-format proposal evaluation and analysis according to some embodiments and implementations of the present disclosure is described with reference to FIG. 4 and continued reference to FIGS. 1-2. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 can be performed by one more computing components or processing devices described earlier with reference to FIGS. 1-2. For example, in some embodiments, one or more steps, operations, or actions of the method 400 can be performed by the server 103, cluster 113, laptop 110, personal computer 108, 106, 112, virtual machine 105, cell phone/smart phone 109, or tablet 111 of FIG. 1 while in the same or other embodiments, one or more steps, operations, or actions of the method 400 can be performed by the remote client device 210, server 240, or evaluation engine 265 running on computing cluster 260 of FIG. 2. It should be understood that one component of the embodiments described herein can cause another component to perform any of the described actions. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible and are contemplated by this disclosure without each being individually described.

In several example embodiments of the present disclosure, the method 400 for processing and analyzing data submissions can include several steps executed by various components of a computing system. For example, in some embodiments, initially, the processing logic can, at block 402, receive (e.g., from a remote computing device communicatively connected to a processing device), an execution request and a set of input data. This set of input data can include textual data, numerical data, video recording data, experimental design document data, audio recording data, network graph data (e.g., social network graphs), curriculum vita data, resume data, business proposal data, financing documentation data, social media page data, and graphical data reflecting a diverse range of information types relevant to the analysis.

Next, the processing logic can convert, at block 404, the set of input data into a first data format to generate a first data file that includes multiple data items. Converting this set of input data into a first data format, resulting in the generation of a first data file enables standardizing the input data for subsequent processing steps. Subsequently, the processing logic can, at block 406, transmit (e.g., send, receive) the first data file. For example, the processing logic can, at block 406, send the first data file to an evaluation engine, causing the evaluation engine to commence its analytical functions.

In some embodiments, the processing logic can at block 410, process the first data file to generate a set of intermediate scores, a combined score, and at least one message for the combined score and for each intermediate score. For example, at block 410, the processing logic can cause the evaluation engine to process the first data file. This processing can result in the generation of a set of intermediate scores, a combined score, and at least one message for both the combined score and for each intermediate score. The processing of the first data file by the evaluation engine can involve several analytical steps designed to extract and evaluate meaningful insights from the data as described in more detail below.

In one example, this can include, the processing logic, at block 412 converting a first subset of data items from the first data file into a corresponding first set of parameter values, where each data item in the first subset corresponds to a respective parameter value in the first set of parameter values. For instance, at block 412, the processing logic can cause the evaluation engine to convert a first subset of data items from the first data file into a corresponding first set of parameter values. Each data item in this first subset can correspond to a respective parameter value in the first set of parameter values. This conversion process can allow the system to quantify and categorize the textual, numerical, and other types of data into specific parameter values that can be further analyzed.

Further, the processing logic, at block 414, can convert a second subset of data items from the first data file into a corresponding second set of parameter values, where at least two data items from the second subset of data items are combined to compute at least one derived parameter value in the second set of parameter values. Thus, in some embodiments, at block 414, the processing logic can cause evaluation engine to convert a second subset of data items from the first data file into a corresponding second set of parameter values. This step is significant when at least two data items from the second subset of data items are combined to compute at least one derived parameter value in the second set of parameter values. This capability to derive new parameter values from combinations of data items enhances the depth and breadth of the analysis, enabling more complex and comprehensive insights. In some embodiments, this can entail a manipulation, transformation, or other transformation that takes multiple data items and processes them (e.g., performs a mathematical, digital, or hybrid transformation) to generate a single parameter value from the combined data items resulting in a many-to-one data-item-to-parameter relationship where the data items are taken from the second subset of data items.

Processing the first data file by the processing logic at block 410 can also include the processing logic, at block 416, the parameter values in the first set of parameter values and in the second set of parameter values into a plurality of information segments, where each information segment is associated with a corresponding parameter value. For example, at block 416, the processing logic (e.g., via the evaluation engine) can segment the parameter values in both the first set and the second set of parameter values into a multitude of information segments. Each information segment can be associated with a corresponding parameter value. Segmenting the parameter values in this manner can facilitate a more granular and focused analysis, as each segment can be evaluated independently or in conjunction with others for patterns, trends, or anomalies. In some embodiments, this segmenting at block 416, can include the processing logic, at block 417, assigning an information category label to at least one parameter value in at least one of the sets of parameter values. This assignment of category labels can further refine the analysis by classifying the data according to predefined or dynamically determined categories, thereby enabling targeted assessments and comparisons across different categories. In some embodiments, the categories can include submission proponent identity (e.g., company founder), traction (e.g., how well an ongoing experiment has been received), team (e.g., a social movement's executive members), scalability and growth potential (e.g., a startup's ability to grow quickly), industry fit (e.g., how well a proposed project meets the needs of an industry), disruptiveness (e.g., a measure of how disruptive a proposed collaboration would be in an economic sector). In several embodiments, each of these categories can have sub-categories or supra-categories. The various embodiments described herein are contemplated to encompass any combination of categories into which information segments and corresponding parameters can be categorized.

Processing the first data file by the processing logic at block 410 can also include the processing logic, at block 419 determining, for each information segment, whether the corresponding parameter value satisfies a condition. For example, at block 419, the processing logic can cause the evaluation engine 265 to determine, for each information segment, whether the corresponding parameter value satisfies a specific condition. The condition can be whether or not the corresponding parameter value is greater than, less than, or equal to a predetermined threshold parameter value. This determination can then be used for filtering, prioritizing, or flagging data segments based on predefined criteria or objectives, thus streamlining the analytical process. In some embodiments this determination at block 419 of whether the corresponding parameter value satisfies a condition, can include the processing logic, at block 420 causing the evaluation engine to determine, for each information segment, whether the corresponding parameter satisfies a stop-factor condition. For example, at block 420, the processing logic can determine whether the corresponding parameter satisfies a stop-factor condition by, for example, exceeding a predetermined minimum threshold value (e.g., number of team members). Identifying stop-factor conditions can be pivotal in highlighting critical issues or barriers that might necessitate immediate attention or that could significantly influence the outcome of the analysis. For example, if a corresponding parameter value exceeds a predetermined maximum threshold value, the subsequent analysis and evaluation can be directed to generate and display a specified corresponding result and message (e.g., if a project proponent's experience level is <3 months, the processing logic can cause components of the system display a resulting combined score of 30% regardless of what other parameters or values are processed by the system in the remainder of the steps).

In several embodiments, responsive to the processing logic (e.g., via the evaluation engine 265) determining, at block 419, that the corresponding parameter value satisfies the condition, the processing logic can, at block 422, assign an intermediate score to the corresponding parameter value. For example, at block 422, responsive to the evaluation engine determining that a corresponding parameter value satisfies a specific condition, the processing logic can cause the evaluation engine to assign an intermediate score to that parameter value. This step can quantify the significance, relevance, or compliance of the parameter value with respect to the evaluated criteria or objectives. Assigning intermediate scores to parameter values enables a numerical representation of the data's alignment with desired outcomes or standards, facilitating a comparative analysis across a range of submissions and/or a range of parameters. This can also include, at block 423, the processing logic applying a selectable weighting function to the corresponding parameter value. In some embodiments, at block 423, the process of assigning an intermediate score to the corresponding parameter value can involve the processing logic applying, at block 423, a selectable weighting function to the parameter value. This weighting function can be selected based on the context, importance, or expected impact of the parameter on the overall evaluation. By allowing the weighting function to be selectable, the processing logic can accommodate a variety of analytical frameworks and preferences, ensuring that the scoring process is adaptable and relevant to the specific needs of the analysis.

The application of selectable weighting functions to parameter values represents a flexible and sophisticated approach to data analysis. It enables the processing logic (e.g., via the evaluation engine 265) to modulate the influence of individual parameters on the overall assessment, according to their perceived or calculated importance. This mechanism ensures that the generated intermediate scores accurately reflect the nuanced complexities of the submissions, providing a robust foundation for the subsequent generation of combined scores and corresponding messages.

These operations illustrate the capability of the processing logic to conduct a detailed and dynamic analysis of data submissions. Through the application of intermediate scores based on selectable weighting functions, the processing logic can produce a finely tuned evaluation of each submission. This evaluation not only highlights the strengths and weaknesses of the submissions but also guides users towards informed decisions and actions based on the analysis' outcomes.

Following the assignment of intermediate scores and the generation of a combined score, the processing logic can, at block 430, perform machine learning operations to further refine the evaluation of data submissions. The application of machine learning techniques allows the system to leverage historical data and patterns to predict or assess future submissions' potential success more accurately. This can include the processing logic, encoding, at block 432, subset of parameter values in vector space to generate a parameter vector and a subset of intermediate scores in vector space to generate a parameter vector. This can also include, the processing logic, at block 434, clustering multiple parameter vectors and/or multiple intermediate scores in vector space.

The processing logic performing machine learning at block 430 can also include, the processing logic associating a parameter vector and/or a score vector with a corresponding measure of success.

For example, in some embodiments, at block 430, the processing logic can perform machine learning processes to further refine the analysis and prediction capabilities of the system. This can include utilizing historical data, known correlations, and patterns to train the system for more accurate and meaningful evaluations of new submissions. Thus, this can include, at block 432, the processing logic encoding a subset of parameter values into a vector space to generate a parameter vector. Similarly, at block 432, it can encode a subset of intermediate scores into a vector space to generate a score vector. This encoding into vector space allows for the application of various machine learning and statistical analysis techniques, facilitating the examination of relationships between different data points in a multi-dimensional space to identify measures of similarity between them.

For example, in some embodiments, at block 434, the processing logic can cluster a plurality of parameter vectors and a plurality of score vectors in vector space. Clustering in vector space enables the system to identify groups or patterns among the parameter values and intermediate scores, which may not be apparent in a less structured format. This can reveal underlying trends, preferences, or inclinations within the data that are relevant to the analysis. Then, at block 436, the processing logic can associate a parameter vector and a score vector with a measure of success. This association involves linking the vectors with outcomes or results that are indicative of success, based on predefined criteria or historical performance. The training data, which consist of parameters and scores in categories known to have high correlations with measures of success, serve as the foundation for this process. Conversely, the test data, comprising parameters and scores in categories with unknown correlations of measures of success, are analyzed in light of the insights gained from the training data. For example, the machine learning process can take parameter values in the category of "startup company CEO experience" with a known correlation with an indicator of "startup company success" and determine whether "number of engineers" is likewise correlated with the measure of success.

The application of machine learning processes, including the encoding of data into vector space, clustering, and association with measures of success, enables the system to not only analyze current submissions but also to predict their potential for success with a higher degree of accuracy. By learning from both historical patterns and real-time inputs, the system can improve its evaluative precision, offering users valuable insights into the viability and potential impact of their endeavors.

In the several embodiments, the processing logic can, at block 440, combine two or more intermediate scores of the set of intermediate scores to generate a combined score. For example, at block 440, the processing logic can cause the evaluation engine to combine two or more intermediate scores from the set of intermediate scores to generate a combined score. This combining process involves aggregating the individual intermediate scores into a single, comprehensive metric that reflects the overall evaluation of the submission.

Further, at block 442, the processing logic can determine or generate a corresponding message for each intermediate score and for the combined score respectively to generate a multiple corresponding messages. For example, at block 442, the processing logic can cause the evaluation engine to determine or to generate a corresponding message for each intermediate score and for the combined score, respectively, thereby generating multiple corresponding messages. Each corresponding message can include a conclusion, an explanation, a recommendation, or a combination thereof, providing actionable insights or feedback related to each score. This can facilitate a detailed and informative feedback mechanism that can guide submission proponents or other interested parties (i.e., users) in understanding the strengths and weaknesses of their submission.

Additionally, the processing logic can, at block 444 convert (e.g., by the evaluation engine) the combined score, the set of intermediate scores, and a plurality of corresponding messages into a second data file. For example, at block 444, the evaluation engine can convert the combined score, the set of intermediate scores, and the plurality of corresponding messages into a second data file that encapsulates the analytical outcomes and insights in a format that is suitable for further processing or dissemination.

Then, at block 446, the processing logic can receive (e.g., from the evaluation engine) the second data file. In some embodiments, at block 446, the processing logic can receive from the evaluation engine, the second data file by transferring the data file containing the processed results back to a processing device (e.g., server 240) for subsequent steps. Consequently, the processing logic can, at block 448 convert the second data file into a second format to generate a converted file comprising a representation of the combined score, a representation of each of the intermediate scores, and a representation of each of the corresponding messages. For example, the processing logic can cause, at block 448, cause the server 240 to convert the second data file into the second format to allow for the customization of the presentation of the results, enhancing readability and user engagement.

In some embodiments, the processing logic converting, at block 448, the second data file can involve, the processing logic generating, at block 449 a webpage that includes a visual representation of the combined score, each intermediate score, and each of the corresponding messages. This visual representation can utilize charts, graphs, or other graphical and audio-visual elements to convey the analytical outcomes in an intuitive and engaging manner.

Furthermore, in some embodiments, responsive to receiving the execution request (e.g., from remote client device 210), the processing logic can, at block 450, present the converted file on a user-interface device. For example, at block 450, processing logic can present the converted file on a user-interface device, by accommodating a variety of devices and user contexts, enhancing accessibility and interaction with the evaluation results. For instance, when the information is presented on a smartphone, the processing logic can optimize the displayed information for small screens. This includes touch-friendly interfaces for navigating through the overall score, intermediate scores, and detailed feedback such as suggestions and explanations. The processing logic can, at block 450, also integrate the presentation of information with smartphone features such as push notifications to alert users about the completion of an evaluation or to highlight important recommendations.

Similarly, when presenting the information on tablets, the processing logic can, at block 450, leverage larger display sizes to provide a more detailed and immersive visualization of the results. The processing logic can utilize this by incorporating interactive elements such as expandable sections for each intermediate score and graphical representations of suggestions and improvements. Moreover, audio-visual elements, such as embedded videos or audio clips explaining key points or providing tutorials for suggested improvements, can be seamlessly integrated into the tablet interface, offering users a richer understanding of the evaluation outcomes.

For users accessing the information via laptops or smart speakers, the processing logic can, at block 450, adapts its presentation accordingly. For laptops, the processing logic can take advantage of larger screens and more powerful processing capabilities to offer sophisticated data visualizations, detailed statistical analysis, and the ability to interact with the data, such as filtering or drilling down into specific aspects of the evaluation. This provides users with a comprehensive platform for in-depth analysis and planning based on the feedback provided. Conversely, when interfacing with smart speakers, the processing logic can present the information by means of audio-based interactions. It can synthesize and vocalize key findings, overall scores, and top-priority suggestions, making the evaluation accessible even in hands-free scenarios. For smart speakers with screens, the system can also display concise visual summaries alongside the audio feedback, blending visual cues with auditory information for a multifaceted feedback experience. This versatility ensures that no matter the device or context, users (e.g., submission proponents or other stakeholders) can have meaningful access to the insights generated by the evaluation engine, empowering them to make informed decisions about their collaborative projects.

Figure 5:
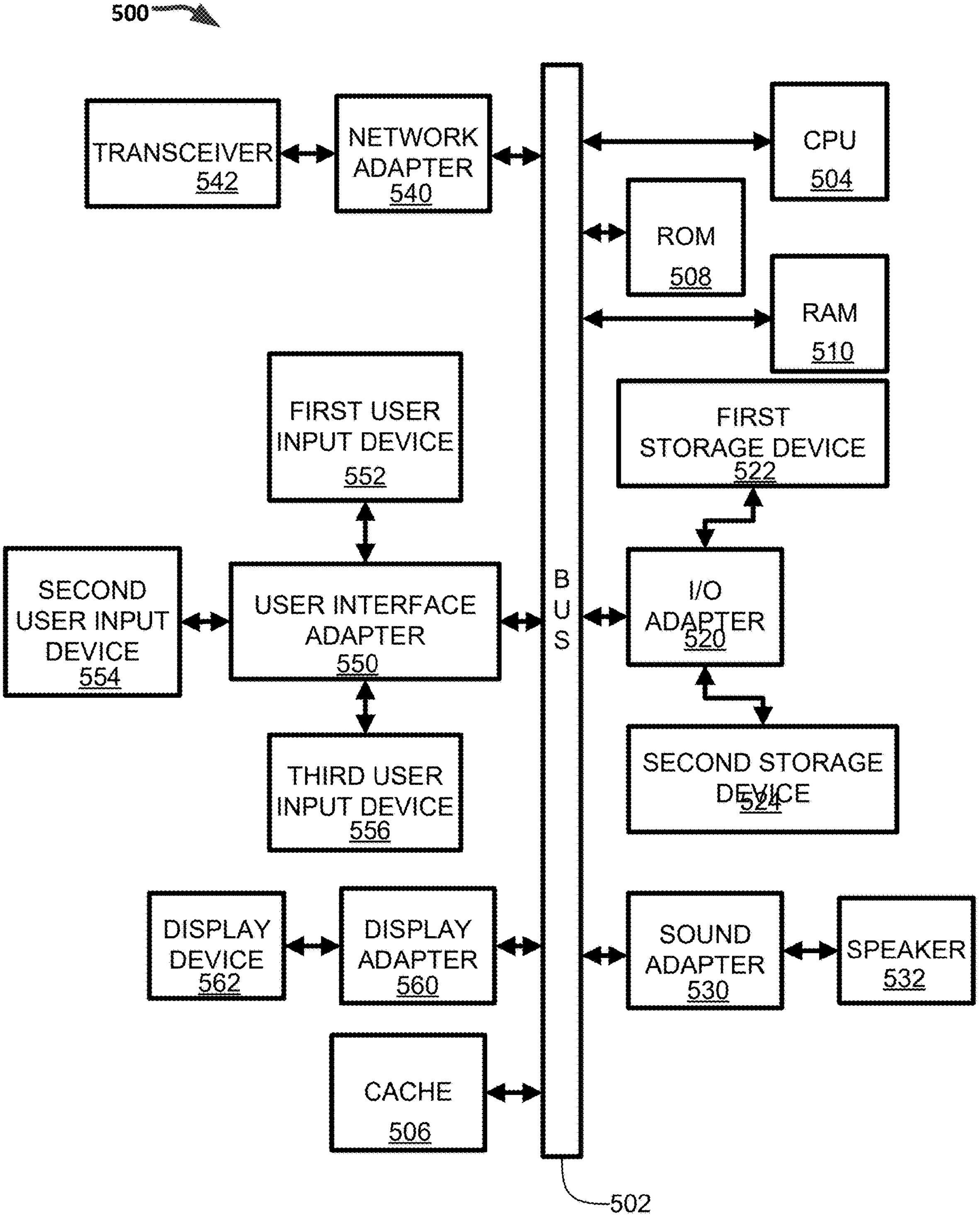
FIG. 5 depicts a block diagram of an example computer system in accordance with one or more embodiments of the present disclosure.

As noted earlier, the methods described above as well as the example web-interface based system can be implemented on a variety of computing devices or machines. An illustrative representation of an example computing device/processing system in accordance with an embodiment of the present disclosure is shown in FIG. 5. With continued reference to FIGS. 1-2, any one of server 103, a server of cluster 113, laptop 110, personal computer 108, 106, 112, smart phone 109, tablet 111, remote client device 210, server 240, or a computer of computing cluster 260 can, in the various embodiments described herein, be computing device 500. The computing device 500 can generally include a Central Processing Unit (CPU) 504 operatively coupled to other components via a system bus 502, optional further processing units including a graphics processing unit (GPU), a cache, a Read Only Memory (ROM) 508, and a Random Access Memory (RAM) 510. The computing device 500 can also include an input/output (I/O) adapter 520, a sound adapter 530, a network adapter 540, a user interface adapter 550, and a display adapter 560, all of which can be operatively coupled to the system bus 502.

Additionally, a first storage device 522 and a second storage device 524 can be operatively coupled to system bus 502 by the I/O adapter 520. The storage devices 522 and 524 can be any of a disk storage device (e.g., a magnetic or optical disk storage device), a solid state magnetic device, and so forth. It should be appreciated that the storage devices 522 and 524 can be the same type of storage device or different types of storage devices. In instances where the device 500 is embodied by a smart speaker 114 or the like, it can incorporate a speaker 532 which can be operatively coupled to system bus 502 by the sound adapter 530. A transceiver 542 can be operatively coupled to system bus 502 by network adapter 540. In instances where the device 500 is embodied by a laptop 110 or a smart phone 109, it can include a display device 562 which can operatively coupled to system bus 502 by display adapter 560.

In some embodiments, the device 500 can include a mother board, alternatively/additionally a different storage medium (e.g., hard disk drive, solid state drive, flash memory, cloud storage), an operating system, one or more application software and one or more input/output devices/means, including one or more communication interfaces (e.g., RS232, Ethernet, WiFi, Bluetooth, USB, etc.) Useful examples of applicable devices for use in embodiments of the present disclosure include, but are not limited to, personal computers, smart phones, laptops, mobile computing devices, tablet PCs, and servers. Multiple computing devices can be operably linked to form a computer network in a manner as to distribute and share one or more resources, such as clustered computing devices and server banks/farms.

Accordingly, in some embodiments a first user input device 552, a second user input device 554, and a third user input device 556 can be operatively coupled to system bus 502 by user interface adapter 550. The user input devices 552, 554, and 556 can be any of a keyboard, a mouse, a keypad, an image capture device (e.g., a camera), a motion sensing device, a microphone, a touch-sensitive device (e.g., a touch screen or touchpad), a device incorporating the functionality of at least two of the preceding devices, and so forth. Of course, other types of input devices can also be used, while remaining within the scope and spirit of the present disclosure. The user input devices 552, 554, and 556 can be the same type of user input device or different types of user input devices. The user input devices 552, 554, and 556 can be used to input and output information to and from system 500.

Thus, the inputs and information discussed above can be obtained from a user via input fields, prompts, and questions via the input means of example device 500 and the information of the converted file discussed above can be presented to the user via the output means of example device 500 in accordance with the embodiments of the present disclosure. Whether visually via a display device 562, audibly via speaker 532, or through a combination of both, a user can be prompted to respond to questions, enter input, upload multi-format files, or make selections in accordance with an embodiment of the present disclosure. Accordingly, whether through tactile, audio, or video input through input devices 552, 554, and 556 a user can provide the input and selections to interact with the various elements and aspects of the present disclosure to provide the information used for the analysis and evaluation of the submission.

Of course, the processing system/device 500 can also include other elements (not shown), as readily contemplated by one of skill in the art, as well as omit certain elements. For example, various other input devices and/or output devices can be included in processing system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 500 are readily contemplated by one of ordinary skill in the art given the teachings of the embodiments provided herein. Similarly, other variations of computer systems can likewise be incorporated in the various embodiments of the repent disclosure.

Figure 6:
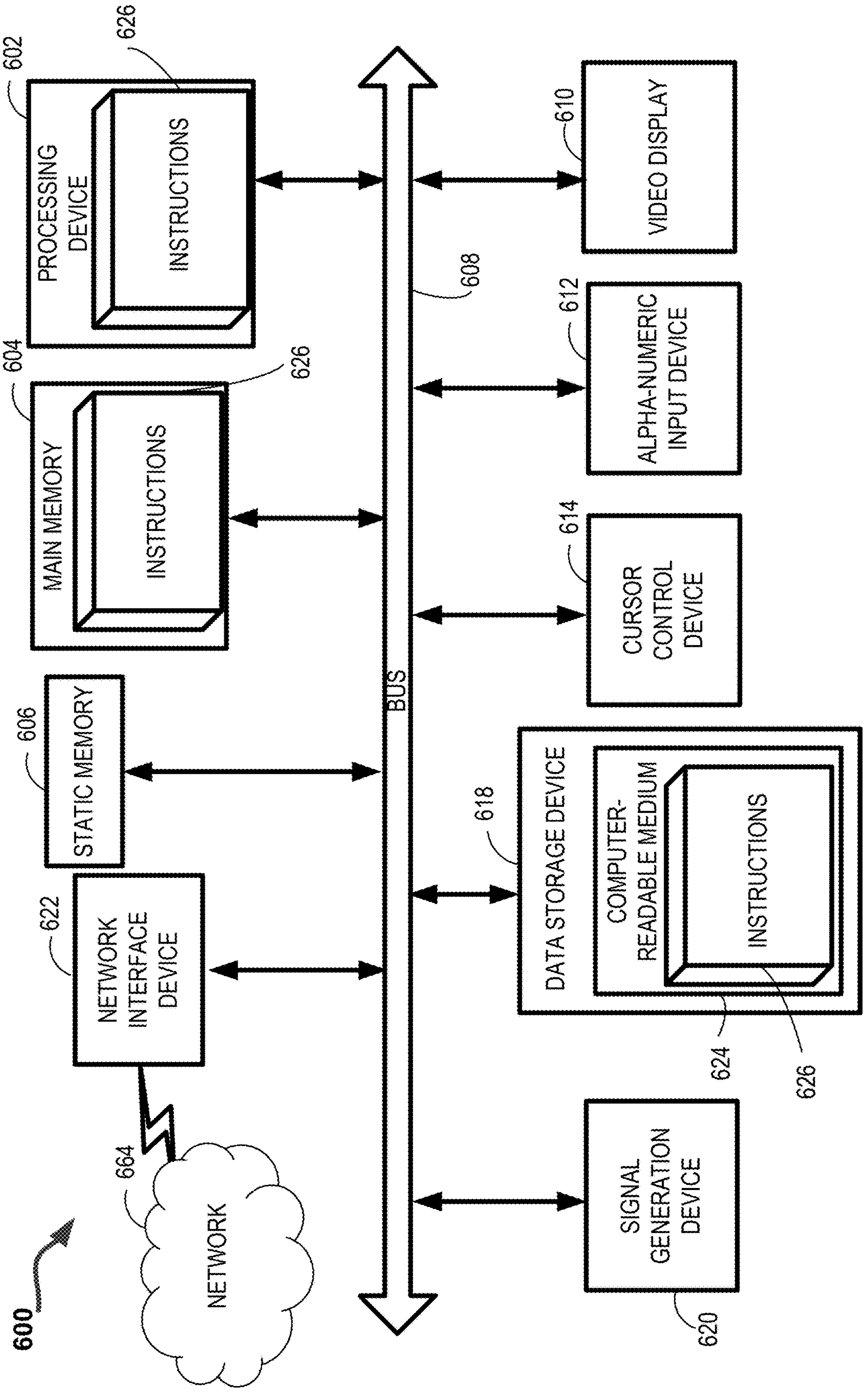
FIG. 6 depicts a block diagram of an illustrative computing device operating in accordance with one or more embodiments of the present disclosure.

FIG. 6 depicts a block diagram of a computer system operating in accordance with one or more aspects of the disclosure. In various illustrative examples, computer system 600 can correspond to any one of server 103, a server of cluster 113, laptop 110, personal computer 108, 106, 112, smart phone 109, tablet 111, remote client device 210, server 240, or a computer of computing cluster 260 of FIGS. 1-2. In some embodiments, computer system 600 can be a virtual computing system or a physical computing system. The computer system can be included within a data center that supports virtualization and distributed computing. Virtualization within a data center results in a physical system being virtualized using virtual machines to consolidate the data center infrastructure and increase operational efficiencies. A virtual machine (VM) can be a program-based emulation of computer hardware. For example, the VM can operate based on computer architecture and functions of computer hardware resources associated with hard disks or other such memory. The VM can emulate a physical computing environment, but requests for a hard disk, memory, or access to other physical resources, can be managed by a virtualization layer of a computing device to translate these requests to the underlying physical computing hardware resources so that they can be emulated as well. This type of virtualization can result in multiple VMs sharing physical resources.

In certain implementations, computer system 600 can be connected (e.g., via a network, such as a Local Area Network (LAN), an intranet, an extranet, or the Internet) to other computer systems. Computer system 600 can operate in the capacity of a server or a client computer in a client-server environment, or as a peer computer in a peer-to-peer or distributed network environment. Computer system 600 can be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein. Analogously, while only a single machine is illustrated, the term "machine" shall also be taken to include any collection of machines that individually or jointly execute a set (or multiple sets) of instructions to perform any one or more of the methodologies discussed herein.

The example computer system 600 includes a processing device (e.g., processor) 602, a main memory (memory device) 604 (e.g., read-only memory (ROM), flash memory, dynamic random access memory (DRAM) such as synchronous DRAM (SDRAM), double data rate (DDR SDRAM), or DRAM (RDRAM), etc.), a static memory 606 (e.g., flash memory, static random access memory (SRAM), etc.), and a data storage device 618, which can communicate with each other via a bus 608.

Processor (i.e., processing device) 602 represents one or more general-purpose processing devices such as a microprocessor, central processing unit, or the like. More particularly, the processor 602 can be a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets. The processor 602 can also be one or more special-purpose processing devices such as and application specific integrated circuit (ASIC), a field programmable gate array (FPGA), a digital signal processor (DSP), network processor, or the like. The processor 602 can be configured to execute instructions 626 for performing the operations discussed herein (e.g., for methods 300-400 for multi-format proposal evaluation and analysis).

Computer system 600 can further include a network interface device 622. Computer system 600 also can include a video display unit 610 (e.g., a liquid crystal display (LCD)), an alphanumeric input device 612 (e.g., a keyboard, a motion sensing input device, touch screen), a cursor control device 614 (e.g., a mouse), and a signal generation device 620 (e.g., a speaker). Data storage device 618 can include a non-transitory computer-readable storage medium 624 on which can store the instructions 626 encoding any one or more of the methods or functions described herein (e.g., methods 300, 400), including instructions for implementing the multi-format proposal evaluation and analysis. Instructions 626 can also reside, completely or partially, within volatile memory 604 and/or within processing device 602 during execution thereof by computer system 600, hence, main memory (volatile memory) 604 and processing device 602 can also constitute machine-readable storage media.

In some embodiment, the instructions 626 include instructions for receiving execution requests, converting input data into various file formats, transmitting data, processing data files, converting data items into parameter values, assigning scores, performing machine learning, generating messages, and presenting information to a user-interface device. While the computer-readable storage medium 624 (machine-readable storage medium) is shown in an example implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media. Other computer system designs and configurations can also be suitable to implement the system and methods described herein. The following examples illustrate various implementations in accordance with one or more aspects of the present disclosure.

Aspects of the various embodiments are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

Throughout this specification and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on any and all of which can be generally referred to herein as a "component", "module," or "system."

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

It will be appreciated that computer program instructions can include computer executable code. The functions, systems, and methods herein described could be utilized and presented in a multitude of languages. Individual systems can be presented in one or more languages and the language can be changed with ease at any point in the process or methods described above. One of ordinary skill in the art would appreciate that there are numerous languages the system could be provided in, and embodiments of the present disclosure are contemplated for use with any language. Computer readable program instructions for carrying out operations of the present disclosure can be assembler instructions, instruction-set-architecture (ISA) instructions, machine instructions, machine-dependent instructions, microcode, firmware instructions, state-setting data, or either source code or object code written in any combination of one or more programming languages, including a functional programming language such as Python, an object-oriented programming language such as SMALLTALK, C++ or the like, and conventional procedural programming languages, such as the "C" programming language or similar programming languages. A variety of languages for expressing computer program instructions are possible, including without limitation, Java, JavaScript, assembly language, Lisp, HTML, Perl, Swift, Ruby, Kotlin, Rust, Go, TypeScript, MATLAB, R, Scala, Erlang, Clojure, F#, Julia, Haskell, Objective-C, Lua, and Dart. Such languages can include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations of the embodiments presented herein are not inherently related to any particular computing device or other apparatus. Various general-purpose systems can also be used with programs in accordance with the teachings herein, or it can prove convenient to construct more specialized apparatus to perform the required method steps. Within this field, the configuration and management of large networks include storage devices and computing devices that are communicatively coupled to dissimilar computing and storage devices over a network, such as the Internet, also referred to as "web" or "world wide web".

Aspects of the present disclosure can be provided as a computer program product that can include a machine-readable medium having stored thereon instructions, which can be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

Reference in this specification to "one embodiment" or "an embodiment" of the present disclosure, as well as other variations thereof, means that a particular feature, structure, characteristic, and so forth described in connection with the embodiment is included in at least one embodiment of the present disclosure. Thus, the appearances of the phrase "in one embodiment" or "in an embodiment", as well any other variations, appearing in various places throughout the specification are not necessarily all referring to the same embodiment.

Having described preferred embodiments of a system and method (which are intended to be illustrative and not limiting), it is noted that modifications and variations can be made by persons skilled in the art in light of the above teachings. It is therefore to be understood that changes can be made in the particular embodiments disclosed which are within the scope of the present disclosure as outlined by the appended claims.

Although the operations of the methods herein are shown and described in a particular order, the order of the operations of each method may be altered so that certain operations may be performed in an inverse order or so that certain operations may be performed, at least in part, concurrently with other operations. In certain implementations, instructions or sub-operations of distinct operations may be in an intermittent and/or alternating manner. In certain implementations, not all operations or sub-operations of the methods herein are required to be performed.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "receiving," "identifying," "displaying," "obtaining," "creating," "generating," "mapping," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purpose of analyzing and evaluating submissions, or it can comprise a general-purpose computer selectively activated or reconfigured by a computer program stored in the computer. Such a computer program can be stored in a computer readable storage medium, such as, but not limited to, any type of disk including floppy disks, optical disks (such as Blu-Ray disks, DVDs), CD-ROMs, and magnetic-optical disks, solid-state drives (SSDs), flash memory devices (including USB flash drives and SD cards), read-only memories (ROMs), random access memories (RAMs), dynamic random access memories (DRAMs), synchronous dynamic random access memories (SDRAMs), electrically erasable programmable read-only memory (EEPROMs), magnetoresistive random-access memories (MRAMs), ferroelectric RAM (FRAM), Phase-change memory (PCM), optical cards, and cloud storage services, or any type of media suitable for storing electronic instructions, each coupled to a computer system bus. Furthermore, emerging storage technologies that provide enhanced data retention and retrieval capabilities, such as three-dimensional (3D) XPoint and other non-volatile memory technologies, are also contemplated.

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Moreover, use of the term "an embodiment" or "one embodiment" or "an implementation" or "one implementation" throughout is not intended to mean the same embodiment or implementation unless described as such. Accordingly, reference throughout this specification to "one implementation," "an implementation," "one embodiment," or "an embodiment" means that a particular feature, structure, or characteristic described in connection with the respective implementations or embodiments is included in at least one implementation or embodiment. Thus, the appearances of the phrase "in one implementation," "in an implementation," "in an embodiment," or "in and implementation" in various places throughout this specification can, but are not necessarily, referring to the same implementation or embodiment, depending on the circumstances. Furthermore, the particular features, structures, or characteristics may be combined in any suitable manner in one or more implementations. Furthermore, the terms "first," "second," "third," "fourth," etc. as used herein are meant as labels to distinguish among different elements and may not have an ordinal meaning according to their numerical designation.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Finally, implementations described herein include collection of data describing a user and/or activities of a user. In one implementation, such data is only collected upon the user providing consent to the collection of this data. In some implementations, a user is prompted to explicitly allow data collection. Further, the user may opt-in or opt-out of participating in such data collection activities. In one implementation, the collected data is anonymized prior to performing any analysis to obtain any statistical patterns so that the identity of the user cannot be determined from the collected data.

What is claimed is:

1. A system comprising:

a memory device;

a data processing platform comprising an evaluation engine;

a human interface device; and a processor coupled to the memory device and communicatively connected to a remote computing device and to the data processing platform, the processor configured to:

receive, from the remote computing device, an execution request and a set of input data;

convert the set of input data into a first data format to generate a first data file comprising a plurality of data items to be transmitted to the evaluation engine;

cause the evaluation engine to process the first data file to generate a set of intermediate scores, a combined score, and at least one message for the combined score and for each intermediate score, wherein causing the evaluation engine to process the first data file comprises:

converting a plurality of subsets of data items into a corresponding plurality of sets of parameter values;

cause the evaluation engine to convert the combined score, the set of intermediate scores, and a plurality of corresponding messages into a second data file;

receive, from the evaluation engine, the second data file;

convert the second data file into a second format to generate a converted file comprising a representation of the combined score, a representation of each of the intermediate scores, and a representation of each of the corresponding messages; and responsive to receiving the execution request, present the converted file on a user-interface device.

2. The system of claim 1, wherein causing the evaluation engine to process the first data file further comprises:

converting, by the evaluation engine, a first subset of data items from the first data file into a corresponding first set of parameter values, wherein each data item in the first subset corresponds to a respective parameter value in the first set of parameter values;

converting, by the evaluation engine, a second subset of data items from the first data file into a corresponding second set of parameter values, wherein at least two data items from the second subset of data items are combined to compute at least one derived parameter value in the second set of parameter values;

segmenting, by the evaluation engine, the parameter values in the first set of parameter values and in the second set of parameter values into a plurality of information segments, wherein each information segment is associated with a corresponding parameter value;

determining, by the evaluation engine, for each information segment, whether the corresponding parameter value satisfies a condition; and responsive to the evaluation engine determining that the corresponding parameter value satisfies the condition, assigning an intermediate score to the corresponding parameter value;

combining, by the evaluation engine, two or more intermediate scores of the set of intermediate scores to generate a combined score; and determining, by the evaluation engine, a corresponding message for each intermediate score and for the combined score respectively to generate the plurality of corresponding messages.

3. The system of claim 2, wherein the processor is further configured to:

encode a subset of parameter values in vector space to generate a parameter vector;

encode a subset of intermediate scores in vector space to generate a parameter vector;

cluster a plurality of parameter vectors in vector space;

cluster a plurality of intermediate scores in vector space;

associate a parameter vector with a measure of success; and associate an intermediate score with a measure of success; and wherein segmenting comprises assigning an information category label to at least one parameter value in at least one of the sets of parameter values; and determining, by the evaluation engine, for each information segment, whether the corresponding parameter value satisfies a condition comprises determining whether the corresponding parameter satisfies a stop-factor condition.

4. The system of claim 2, wherein assigning an intermediate score to the corresponding parameter value comprises applying a selectable weighting function to the corresponding parameter value.

5. The system of claim 1, wherein the corresponding message comprises a conclusion, an explanation, a recommendation, or a combination of two or more of a conclusion, an explanation, and a recommendation.

6. The system of claim 1, wherein converting the second data file comprises generating a webpage that comprises a visual representation of the combined score, a visual representation of each intermediate score, and a visual representation of each of the corresponding messages.

7. The system of claim 1, wherein the first data format comprises textual, numerical data, structural data, multimedia data or a combination thereof, wherein the second format is an audio, graphical, video, or an audio-visual format, and wherein the data processing platform is configured to generate scores based on input data.

8. A method comprising:

receiving, from a remote computing device, an execution request and a set of input data;

converting, by a processing device communicatively connected to the remote computing device, the set of input data into a first data format to generate a first data file comprising a plurality of data items;

transmitting the first data file by the processing device to an evaluation engine;

processing the first data file by the evaluation engine to generate a set of intermediate scores, combining, by the evaluation engine, the intermediate scores of the set of intermediate scores to generate a combined score;

determining, by the evaluation engine, a corresponding message for each intermediate score and for the combined score respectively to generate a plurality of corresponding messages;

converting, by the evaluation engine, the combined score, the set of intermediate scores, and the plurality of corresponding messages into a second data file;

receiving, from the evaluation engine, the second data file;

converting the second data file into a second format to generate a converted file comprising a representation of the combined score, a representation of each of the intermediate scores, and a representation of each corresponding message; and responsive to the execution request, presenting the converted file on a user-interface device.

9. The method of claim 8, wherein processing the first data file comprises:

converting, by the evaluation engine, a first subset of data items from the first data file into a corresponding first set of parameter values, wherein each data item in the first subset corresponds to a respective parameter value in the first set of parameter values;

converting, by the evaluation engine, a second subset of data items from the first data file into a corresponding second set of parameter values, wherein at least two data items from the second subset of data items are combined to compute at least one derived parameter value in the second set of parameter values;

segmenting, by the evaluation engine, the parameter values in the first set of parameter values and in the second set of parameter values into a plurality of information segments, wherein each information segment is associated with a corresponding parameter value;

determining, by the evaluation engine, for each information segment, whether the corresponding parameter value satisfies a condition; and responsive to determining that the corresponding parameter value satisfies the condition, assigning an intermediate score to the corresponding parameter value.

10. The method of claim 8, further comprising:

encoding a subset of parameter values in vector space to generate a parameter vector;

encoding a subset of intermediate scores in vector space to generate a score vector;

clustering a plurality of parameter vectors in vector space;

clustering a plurality of score vectors in vector space;

associating a parameter vector with a measure of success; and associating a score vector with a measure of success; and wherein segmenting comprises assigning an information category label to at least one parameter value in at least one of the sets of parameter values.

11. The method of claim 8, wherein determining, by the evaluation engine, for each information segment, whether the corresponding parameter value satisfies a condition comprises determining whether the corresponding parameter satisfies a stop-factor condition.

12. The method of claim 8, wherein assigning an intermediate score to the corresponding parameter value comprises applying a selectable weighting function to the corresponding parameter value.

13. The method of claim 8, wherein the corresponding message comprises a conclusion, an explanation, a recommendation, or a combination of two or more of a conclusion, an explanation, and a recommendation.

14. The method of claim 8, wherein converting the second data file comprises generating a webpage that comprises a visual representation of the combined score, a visual representation of each intermediate score, and a visual representation of each corresponding message, and wherein the first data format comprises textual, numerical data, structural data, multimedia data or a combination thereof, wherein the second format is an audio, graphical, video, or an audio-visual format.

15. A non-transitory machine-readable storage medium comprising instructions that, when accessed by a processing device, cause the processing device to:

receive, from a remote computing device communicatively connected to the processing device, an execution request and a set of input data, wherein the set of input data comprises textual data and numerical data;

convert the set of input data into a first data format to generate a first data file comprising a plurality of data items;

transmit the first data file to an evaluation engine;

cause the evaluation engine to process the first data file to generate a set of intermediate scores, a combined score, and at least one message for the combined score and for each intermediate score, wherein causing the evaluation engine to process the first data file comprises:

converting a plurality of subsets of data items into a corresponding plurality of sets of parameter values; and combining, by the evaluation engine, two or more intermediate scores of the set of intermediate scores to generate the combined score;

cause the evaluation engine to convert the combined score, the set of intermediate scores, and a plurality of corresponding messages into a second data file;

receive, from the evaluation engine, the second data file;

convert the second data file into a second format to generate a converted file comprising a representation of the combined score, a representation of each of the intermediate scores, and a representation of each of the corresponding messages; and responsive to receiving the execution request, present the converted file on a user-interface device.

16. The non-transitory machine-readable storage medium of claim 15, wherein causing the evaluation engine to process the first data file further comprises:

converting, by the evaluation engine, a first subset of data items from the first data file into a corresponding first set of parameter values, wherein each data item in the first subset corresponds to a respective parameter value in the first set of parameter values;

converting, by the evaluation engine, a second subset of data items from the first data file into a corresponding second set of parameter values, wherein at least two data items from the second subset of data items are combined to compute at least one derived parameter value in the second set of parameter values;

segmenting, by the evaluation engine, the parameter values in the first set of parameter values and in the second set of parameter values into a plurality of information segments, wherein each information segment is associated with a corresponding parameter value;

determining, by the evaluation engine, for each information segment, whether the corresponding parameter value satisfies a condition;

responsive to the evaluation engine determining that the corresponding parameter value satisfies the condition, assigning an intermediate score to the corresponding parameter value; and determining, by the evaluation engine, a corresponding message for each intermediate score and for the combined score respectively to generate a plurality of corresponding messages.

17. The non-transitory machine-readable storage medium of claim 16, wherein the instructions, when accessed by a processing device, further cause the processing device to:

encode a subset of parameter values in vector space to generate a parameter vector;

encode a subset of intermediate scores in vector space to generate a score vector;

cluster a plurality of parameter vectors in vector space;

cluster a plurality of score vectors in vector space;

associate a parameter vector with a measure of success; and associate a score vector with a measure of success.

18. The non-transitory machine-readable storage medium of claim 16, wherein segmenting comprises assigning an information category label to at least one parameter value in at least one of the sets of parameter values;

determining, by the evaluation engine, for each information segment, whether the corresponding parameter value satisfies a condition comprises determining whether the corresponding parameter satisfies a stop-factor condition; and assigning an intermediate score to the corresponding parameter value comprises applying a selectable weighting function to the corresponding parameter value.

19. The non-transitory machine-readable storage medium of claim 15, wherein the corresponding message comprises a conclusion, an explanation, a recommendation, or a combination of two or more of a conclusion, an explanation, and a recommendation.

20. The non-transitory machine-readable storage medium of claim 15, wherein converting the second data file comprises generating a webpage that comprises a visual representation of the combined score, a visual representation of each intermediate score, and a visual representation of each of the corresponding messages.

* * * * *